(12) United States Patent
Tonouchi

(10) Patent No.: US 9,323,585 B2
(45) Date of Patent: Apr. 26, 2016

(54) DEADLOCK PREVENTING APPARATUS, DEADLOCK PREVENTING METHOD, AND PROGRAM

(75) Inventor: Toshio Tonouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 143 days.

(21) Appl. No.: 14/117,283

(22) PCT Filed: May 8, 2012

(86) PCT No.: PCT/JP2012/061716
§ 371 (c)(1),
(2), (4) Date: Nov. 12, 2013

(87) PCT Pub. No.: WO2012/153722
PCT Pub. Date: Nov. 15, 2012

(65) Prior Publication Data
US 2014/0250441 A1  Sep. 4, 2014

(30) Foreign Application Priority Data
May 12, 2011  (JP) ................................. 2011-107588

(51) Int. Cl.
G06F 9/46 (2006.01)
G06F 9/52 (2006.01)
G06F 11/36 (2006.01)

(52) U.S. Cl.
CPC ............ *G06F 9/524* (2013.01); *G06F 11/3604* (2013.01)

(58) Field of Classification Search
CPC .............................. G06F 9/524; G06F 11/3604
USPC ................. 718/106; 717/136–161; 714/1–57; 71/400–401; 713/400–401
See application file for complete search history.

(56) References Cited

U.S. PATENT DOCUMENTS

| 4,403,285 | A | * | 9/1983 | Kikuchi ........................ 718/104 |
| 5,442,763 | A |   | 8/1995 | Bartfai et al. |
| 7,774,783 | B2 | * | 8/2010 | Toader .......................... 718/104 |
| 2009/0235002 | A1 | * | 9/2009 | Nir-Buchbinder et al. ... 710/240 |
| 2011/0107151 | A1 | * | 5/2011 | Che et al. ..................... 714/38.1 |
| 2013/0042039 | A1 | * | 2/2013 | Hameed et al. ............... 710/200 |

FOREIGN PATENT DOCUMENTS

| EP | 0 532 333 A2 | 3/1993 |
| JP | H06-103091 A | 4/1994 |
| JP | H07-191944 A | 7/1995 |
| JP | H11-031080 A | 2/1999 |

(Continued)

OTHER PUBLICATIONS

Taylor, Michael Bedford, et al. "The Raw microprocessor: A computational fabric for software circuits and general-purpose programs." Micro, IEEE 22.2 (2002), pp. 25-35.*

(Continued)

*Primary Examiner* — Satish Rampuria
(74) *Attorney, Agent, or Firm* — Wilmer Cutler Pickering Hale and Dorr LLP

(57) ABSTRACT

A deadlock preventing apparatus includes a deadlock detecting section 360 configured to detect a lock command causing a deadlock on a program code of application programs 120, 130 and an emergency processing section 180 configured to insert a new lock command and a new unlock command to the program code to encompass a part from a lock command place corresponding to the lock command detected by the deadlock detecting section 360 to an unlock command place.

7 Claims, 34 Drawing Sheets

(56) References Cited

FOREIGN PATENT DOCUMENTS

| | | |
|---|---|---|
| JP | 2004-246439 A | 9/2004 |
| JP | 2009-271858 A | 11/2009 |

OTHER PUBLICATIONS

Wang, Yin, et al. "The theory of deadlock avoidance via discrete control." ACM SIGPLAN Notices. vol. 44. No. 1. ACM, 2009, pp. 252-263.*

Boyapati, Chandrasekhar, Robert Lee, and Martin Rinard. "Ownership types for safe programming: Preventing data races and deadlocks." ACM SIGPLAN Notices. vol. 37. No. 11. ACM, 2002, pp. 211-230.*

International Search Report of PCT/JP2012/061716 mailed Jul. 10, 2012 (5 pages).

* cited by examiner

Fig. 17

DEADLOCK GRAPH SIDE ATTRIBUTE TABLE

| SEQUENCE ID | src PLACE | dest PLACE |
|---|---|---|
| 1 | #2 | #6 |
| 5 | | |
| 10 | | |

| SEQUENCE ID | TOP | THREAD ID/fin |
|---|---|---|
| 1 | | ENDED |
| | | |
| | | |

DEADLOCK GRAPH THREAD TABLE

| dest/src | $V_1$ | $V_2$ | $V_3$ | $V_4$ | .... |
|---|---|---|---|---|---|
| $V_1$ | N/A | 0 | 1 | 0 | |
| $V_2$ | 0 | N/A | 0 | 0 | |
| $V_3$ | 0 | 0 | N/A | 0 | |
| $V_4$ | 1 | 0 | 0 | N/A | |
| : | | | | | ... |

Fig. 20

| # | FILE NAME | ADDRESS@LOCK |
|---|-----------|--------------|
| 1 | com.nec.a.A | hoge@3 |
| 2 | com.nec.a.C | f@33 |
| 3 | com.nec.a.F | g@30 |
| 4 | com.nec.a.C | h@30 |
| 5 | com.nec.a.D | i@56 |
| 6 | com.nec.a.E | j@101 |
| 7 | com.nec.a.A | k@234 |

Fig. 21

| LOCK TARGET OBJECT ID | LOCK ACQUIRED THREAD | LOCK WAITING THREAD |
|---|---|---|
| $V_1$ | $T_1$ | |
| $V_2$ | | |
| $V_3$ | $T_3$ | |
| $V_4$ | $T_1$ | |

Fig. 27

| # | FILE NAME | ADDRESS@LOCK |
|---|---|---|
| 1 | com.nec.a.A | hoge@3 |
| 2 | com.nec.a.C | f@33 |
| 3 | com.nec.a.F | g@30 |
| 4 | com.nec.a.C | h@30 |
| 5 | com.nec.a.D | i@56 |
| 6 | com.nec.a.E | j@101 |
| 7 | com.nec.a.A | k@234 |
| 8 | com.nec.a.B | l#19 |

Fig. 29

DEADLOCK GRAPH SIDE ATTRIBUTE TABLE

| SEQUENCE ID | src PLACE | dest PLACE |
|---|---|---|
| 2 | #7 | #8 |
| | | |
| | | |

DEADLOCK GRAPH THREAD TABLE

| SEQUENCE ID | TOP | THREAD ID/fin |
|---|---|---|
| 1 | | ENDED |
| 2 | | T₁ |

| dest/src | V₁ | V₂ | V₃ | V₄ | .... |
|---|---|---|---|---|---|
| V₁ | N/A | 0 | 1 | 0 | |
| V₂ | 0 | N/A | 0 | 0 | |
| V₃ | 0 | 0 | N/A | 1 | |
| V₄ | 1 | 0 | 0 | N/A | |
| : | | | | | ... |

Fig. 32

```
public void hoge();
0: aload_0
1: dup
2: astore_1
3: monitorenter
4: aload_0
5: ifnull #19
6: iload_1
7: iconst_2
8: if_icmpge #27
10: aload_1
11: monitorexit
12: astore #str "out"
14: invokestatic #xx
```

Fig. 33

```
public void hoge();
0: aload_0
1: dup
2: astore_1
3: aload #str "LockA_B"
4: invokestatic Lock#getLock
5: monitorenter
6: monitorenter
7: aload_0
8: ifnull #19
9: iload_1
10: iconst_2
11: if_icmpge #27
12: aload_1
13: monitorexit
14: aload #str "LockA_B"
15: invokestatic Lock#getLock
16: monitorexit
17: astore #str "out"
18: invokestatic #xx
```

DEADLOCK PREVENTING APPARATUS, DEADLOCK PREVENTING METHOD, AND PROGRAM

CROSS-REFERENCE TO RELATED APPLICATIONS

This application is a national stage application of International Application No. PCT/JP2012/061716 entitled "Deadlock Preventing Apparatus, Deadlock Preventing Method, and Program," filed on May 8, 2012, which claims the benefit of the priority of Japanese patent application No. 2011-107588, filed on May 12, 2011, the disclosures of each of which are hereby incorporated by reference in their entirety.

BACKGROUND

The present invention relates to a deadlock preventing apparatus, a deadlock preventing method, and a program.

Examples of deadlock automatic releasing systems are described in Patent Document 1 and Patent Document 2.
Patent Document 1: Patent Publication JP-A-7-191944
Patent Document 2: Patent Publication JP-A-2004-246439

The deadlock automatic releasing system described in Patent Document 1 has a limit in an application program for requesting lock. That is, to release a deadlock from a deadlock state, the application program has to be capable of executing processing necessary for releasing the deadlock. For example, in Patent Document 1, respective application programs have to acquire global lock in advance. In Patent Document 2, when process forced stop means unlocks a process (or a thread), the application program needs to execute rollback processing from locking of the process until unlocking of the process. In this way, the application program needs to be created to be adaptable to automatic release of a deadlock.

SUMMARY

It is one of exemplary objects of the present invention to provide a deadlock preventing apparatus, a deadlock preventing method, and a program that make it possible to avoid a deadlock even if a function for deadlock avoidance is not imparted to an application program.

A deadlock preventing apparatus according to the present invention includes: a deadlock-occurrence-position detecting section configured to detect a lock command causing a deadlock on a code of an application program; and an emergency processing section configured to insert a new lock command and a new unlock command into the program code to encompass a part from a lock command place corresponding to the lock command detected by the deadlock-occurrence-position detecting section to an unlock command place.

According to an exemplary aspect of the present invention, it is possible to provide a deadlock preventing apparatus, a deadlock preventing method, and a program that can avoid a deadlock even if a function for deadlock avoidance is not imparted to an application program.

DESCRIPTION OF DRAWINGS

FIG. 17 is a diagram showing a deadlock graph matrix according to the embodiment of the present invention.

FIG. 20 is a diagram showing a lock address table according to the embodiment of the present invention.

FIG. 21 is a diagram showing a lock management table according to the embodiment of the present invention.

FIG. 27 is a diagram showing an example of a lock address table according to an example of the present invention.

FIG. 29 is a diagram showing an example of a deadlock graph matrix according to the example of the present invention.

FIG. 32 is a diagram showing a program code before emergency processing application according to the example of the present invention.

FIG. 33 is a diagram showing a program code after emergency processing application according to the example of the present invention.

EXEMPLARY EMBODIMENT

First Embodiment

Modes for carrying out the present invention are explained in detail below with reference to the drawings.

Figure 1:
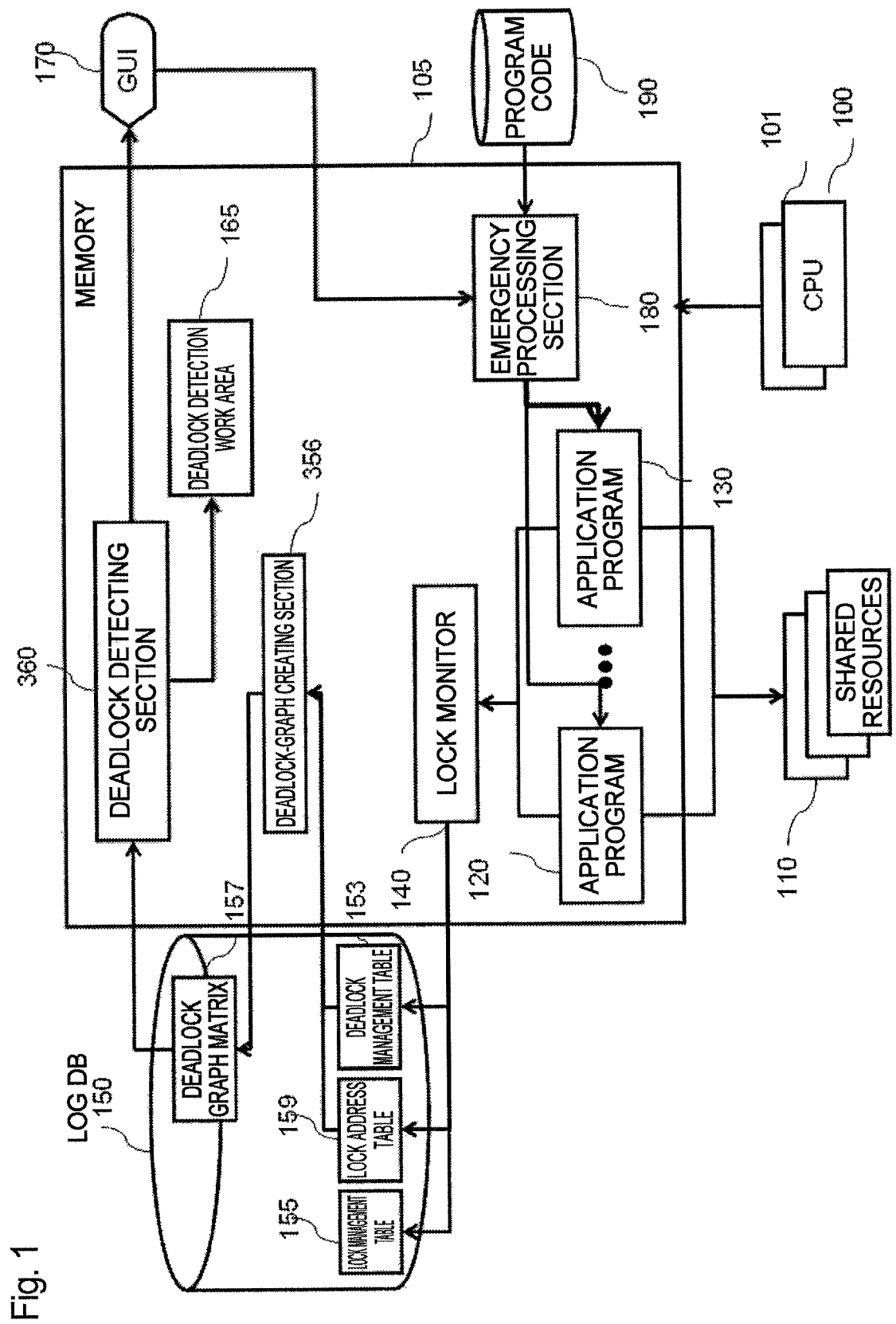
FIG. 1 is a block diagram showing the configuration of a deadlock preventing apparatus according to a first embodiment of the present invention.

FIG. 1 is a block diagram showing the configuration of a deadlock preventing apparatus according to a first embodiment of the present invention. As shown in the figure, the deadlock preventing apparatus according to the first embodiment of the present invention includes a singularity or a plurality of CPUs 100 and 101 configured to operate according to program control, a plurality of application programs 120 and 130, shared resources 110 accessed by the plurality of application programs 120 and 130, a lock monitor 140 configured to control the order of access to the shared resources 110, a log DB 150 for recording a state of lock managed by the lock monitor 140, a deadlock detecting section (a deadlock-occurrence-position detecting section) 360 configured to detect a deadlock place on the bass of information recorded in the log DB 150, a GUI 170 for informing an administrator of an occurrence situation of a deadlock, a program code 190 of the application programs 120 and 130, an emergency processing section 180 configured to embed a code for preventing a deadlock in the program code 190 of the application programs 120 and 130 concerning a place designated and approved by the administrator via the GUI 170 among detected deadlock risk parts, and a memory 105 configured to store programs for the lock monitor 140, the deadlock detecting section 360, and the like.

In the log DB 150, a lock management table 155 indicating a lock acquisition situation, a deadlock management table 153, a deadlock graph matrix 157, which is a work area for detecting a deadlock, and a lock address table 159 for recording an occurrence place of a lock request on an application program are stored. In the memory 105, a deadlock-graph creating section 356 configured to generate a deadlock graph matrix 157 from the deadlock management table 153 is stored.

Figure 19:
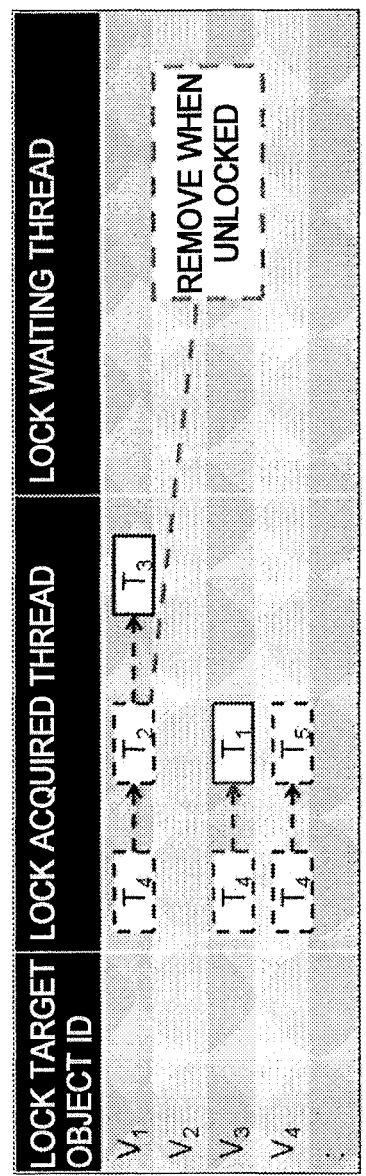
FIG. 19 is a diagram showing a lock management table according to the embodiment of the present invention.

The lock management table 155 is, for example, as shown in FIG. 19, a table for managing IDs of threads, which perform lock requests, as a linear list with a lock target object ID set as a key. A thread corresponding to a thread ID registered first among the thread IDs on the linear list is a thread that acquires lock with respect to the lock target object. The other threads on the linear list are lock waiting threads.

The lock address table 159 is, for example, as shown in FIG. 20, a table for recording a row ID (#) and a file name and an address, which are lock command places on the program code 190.

Figure 16:
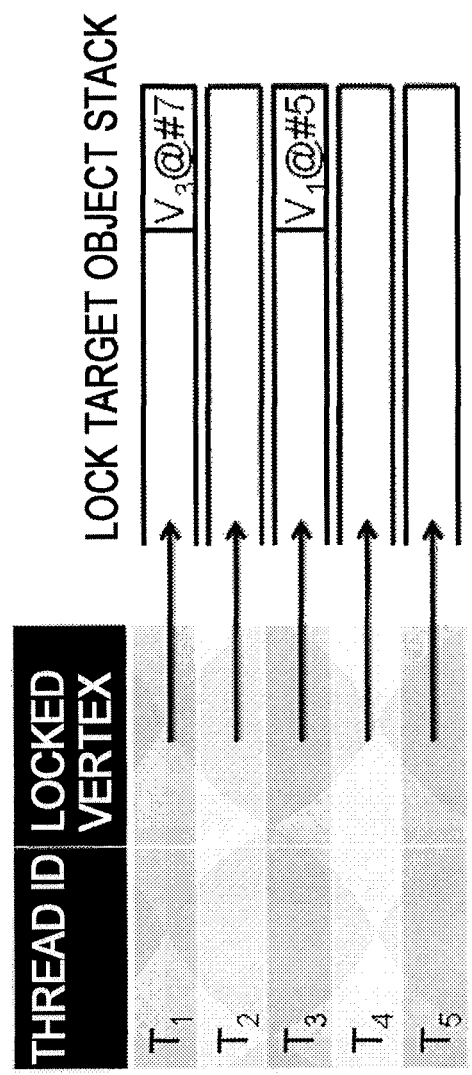
FIG. 16 is a diagram showing a deadlock management table according to the embodiment of the present invention.

The deadlock management table 153 is configured by, for example, as shown in FIG. 16, a deadlock management table main body and a lock target object stack. A main body of the deadlock management table 153 is a table for managing the lock target object stack with an ID of a thread, which performs a lock request, set as a key. The lock target object stack is a stack for retaining a set of an ID of a lock target object, for which the thread issues a lock request, and a row ID indicating a lock command place recorded in the lock address table 159.

Figure 18:
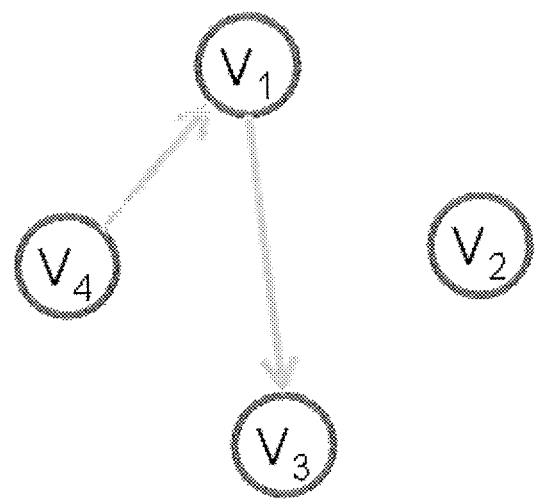
FIG. 18 is a diagram showing an example of a deadlock graph according to an example of the present invention.

The deadlock graph matrix 157 is configured by, for example, as shown in FIG. 17, a deadlock graph matrix main body, a deadlock graph thread table, and a deadlock graph side attribute table present for each matrix element of the deadlock graph matrix main body. The deadlock graph matrix 157 shown in FIG. 17 has a value same as a value of a deadlock graph shown in FIG. 18. The deadlock graph matrix main body indicates a history of a plurality of lock requests performed by the same thread. For example, when a thread T requests lock of $V_4$ and requests lock of $V_1$ before unlocking $V_4$, an element of a row $V_4$ and a column $V_1$ of the deadlock graph matrix is 1.

The deadlock graph thread table is a table for managing, with a sequence ID, which is an ID given to each row, set as a key, when the same thread acquires a plurality of times of lock, a top pointer to a matrix element of the deadlock graph matrix main body indicating a top of the lock and an ID of a thread currently requesting lock. However, when the thread unlocks all locked objects, a value of a column of "thread ID" is rewritten from the thread ID to "ended".

The deadlock graph side attribute table is a table for managing, with the sequence ID of the deadlock graph thread table set as a key, a row ID of a lock address table in which a lock request place of an object "src" requested by a thread to be locked earlier is recorded and a row ID of the lock address table in which a lock request place of an object "dest" requested to be locked by the thread next is recorded.

For example, a case in which the thread T is recorded in a sequence ID 1 of the deadlock graph thread table and performs a lock request of $V_1$ to $V_3$ is explained as an example. When a row ID of the lock address table 159 in which the lock request place where the lock quest to $V_1$ is issued is recorded is represented as #2 and a row ID of the lock address table 159 in which a lock request place where a lock request to $V_3$ is issued is recorded is represented as #6, a row {sequence ID=1, src=#2, dest=#6} is recorded in the deadlock graph side attribute table corresponding to a matrix element of ($V_1$, $V_3$).

Figure 14:
FIG. 14 is a diagram showing a deadlock detection work area according to the embodiment of the present invention.

A deadlock detection work area 165 is, as shown in FIG. 14, a stack for storing a lock target object.

The operation of the deadlock preventing apparatus is explained below.

The application programs 120 and 130 are programs for providing a system user with a service. In this embodiment, the application programs 120 and 130 are deadlock detection target programs. Note that, in the application programs, a plurality of threads operate in parallel.

The lock monitor 140 receives lock requests from the application programs 120 and 130. When accessing the shared resources 110, the application programs 120 and 130 request lock in order to avoid a situation in which consistency cannot be maintained due to the influence from the other applications. The lock monitor 140 receives the requests and records the lock requests in the lock management table 155, the deadlock management table 153, and the lock address table 159. Further, according to a situation, the lock monitor 140 permits the lock or puts a thread, which requests the lock, in a waiting state.

The deadlock-graph creating section 356 reads a state of lock recorded in the deadlock management table 153 and records a history of lock requests in the deadlock graph matrix 157. The deadlock graph matrix 157 is a work area for detecting a risk of a deadlock.

The deadlock detecting section 360 detects a closed graph on the deadlock graph referring to the deadlock graph matrix 157 to detect a deadlock part and displays the deadlock part on the GUI 170.

The emergency processing section 180 reads the program code 190, rewrites a program part equivalent to a place where a deadlock detected by the deadlock detecting section 360 occurs, and replaces the application programs 120 and 130.

Figure 3:
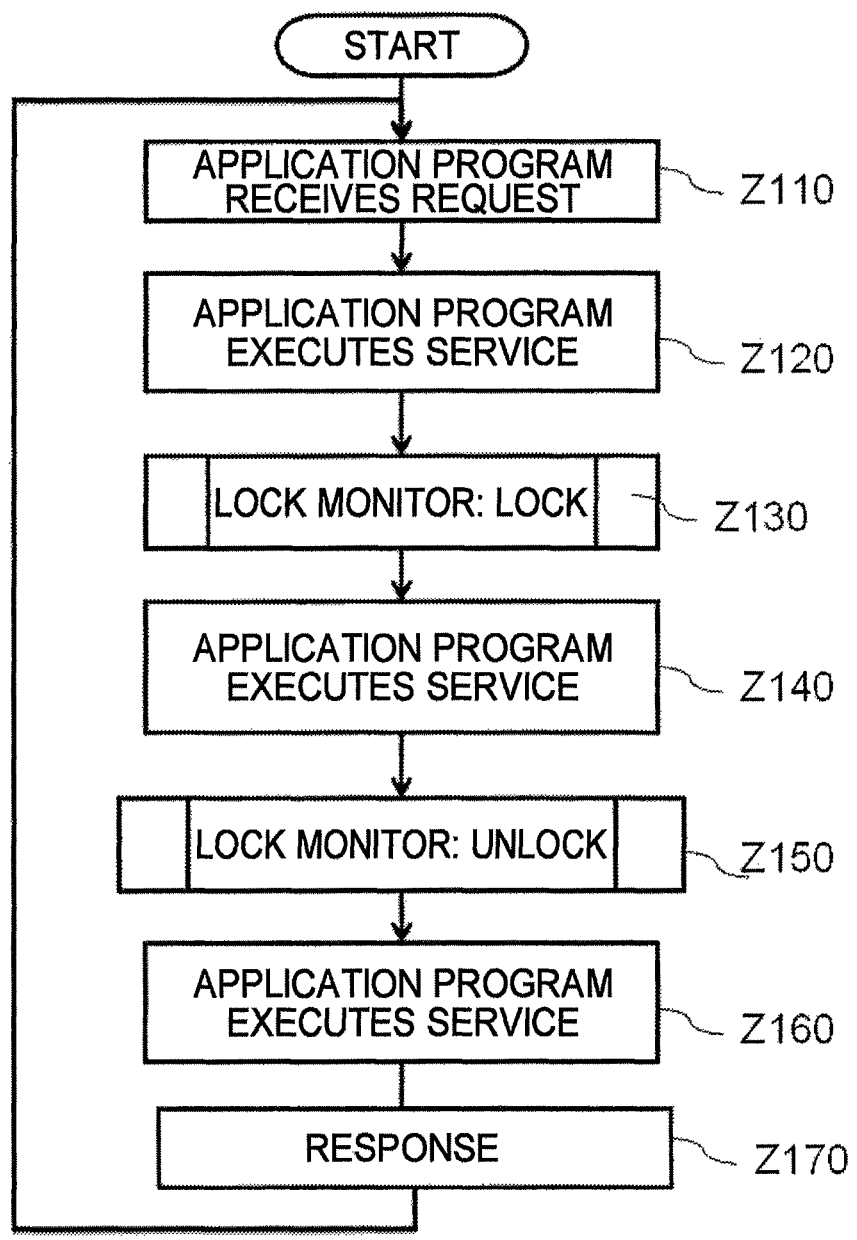
FIG. 3 is a flowchart for explaining the operation of a deadlock preventing apparatus according to the embodiment of the present invention.

The operation of the deadlock preventing apparatus according to this embodiment is explained in detail below with reference to FIG. 3.

First, the application program 120 receives a request for processing execution (step Z110).

Subsequently, the application program 120 executes a service in response to the request (step Z120).

During the execution of the application program, if it is necessary to access the shared resources 110, the application program 120 requests the lock monitor 140 to give lock (step Z130).

Upon acquiring the lock, the application program 120 executes the service (step Z140).

When the shared resources 110 become unnecessary, the application program 120 notifies the lock monitor 140 of unlock (step Z150).

The application program 120 continues to execute the service (step Z160).

When a sequence of processing is completed, the application program 120 returns a response (step Z170). Further, returning to step Z110, the application program 120 receives a request.

Lock request processing of the lock monitor 140 is explained in detail below with reference to FIG. 4.

First, the lock monitor 140 acquires an ID of a thread that performs a lock request, an ID of a lock target object, and a file name and an address (e.g., a row number) in a file in which a lock command is executed (step A120). Note that, in the following explanation, the file name and the address (e.g., the row number) in the file in which the lock command is executed are referred to as lock command place.

Subsequently, the lock monitor 140 performs, in order to detect a risk of a deadlock, deadlock management processing for recording lock information in the deadlock management table 153 (step A130). Subsequently, the lock monitor 140 performs lock address registration processing for recording a place where a lock command is generated (step A140).

Subsequently, the lock monitor 140 performs lock management processing for recording the lock information in the lock management table 155 (step A150).

Figure 5:
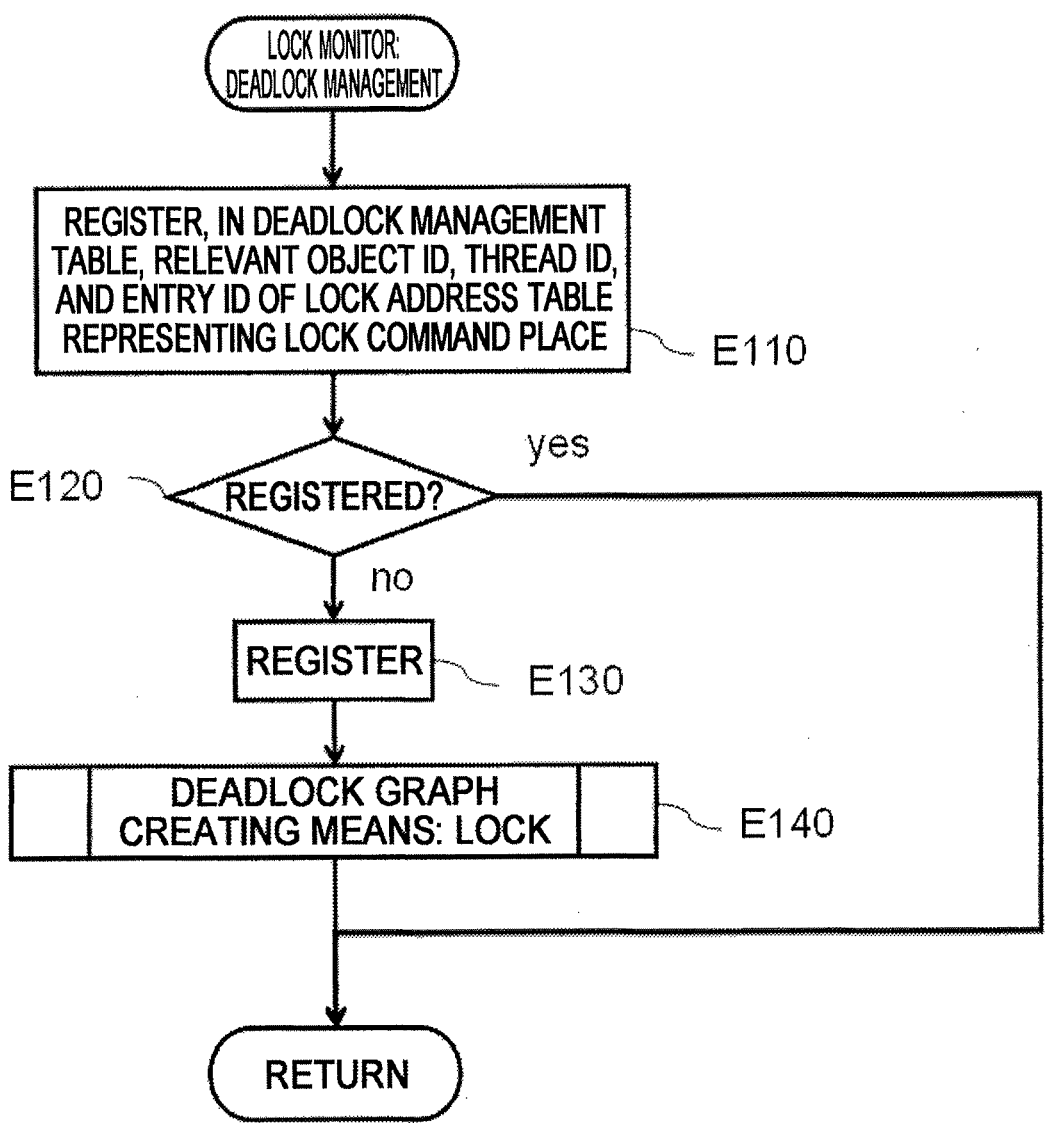
FIG. 5 is a flowchart of deadlock management processing of the lock monitor according to the embodiment of the present invention.

Deadlock management processing of the lock monitor 140 is explained below with reference to FIG. 5. This processing is started from the lock request processing (step A130) of the lock monitor 140.

First, the deadlock monitor 140 registers, in the deadlock management table 153, three sets of data, i.e., an object ID, a thread ID, a relevant row ID of the lock address table 159 in which a lock command place is recorded (step E110). However, if the relevant row is already registered, the lock monitor 140 ends the processing without registering the ID (step E120). For example, in the case of a language for not performing lock (in the case of java (registered trademark), synchronized) from the same thread to the same lock target object like java (registered trademark), step E120 is necessary. The same applies to steps C125 and step G120 explained below.

If the relevant row is not registered yet in step E120, the lock monitor 140 registers, in the deadlock management table 153, a lock target object ID, a thread ID, and an entry ID of a relevant row of the lock address table 159 in which the lock request place is registered (step E130). That is, the lock monitor 140 pushes and records a set of the lock target object ID and the relevant row ID of the lock address table 159 in a lock target object stack present in an entry of the relevant thread ID of the lock management table 153.

Further, the deadlock-graph creating section 356 records the relevant object ID and the registered lock target object ID in the deadlock graph matrix 157 (step E140).

Figure 6:
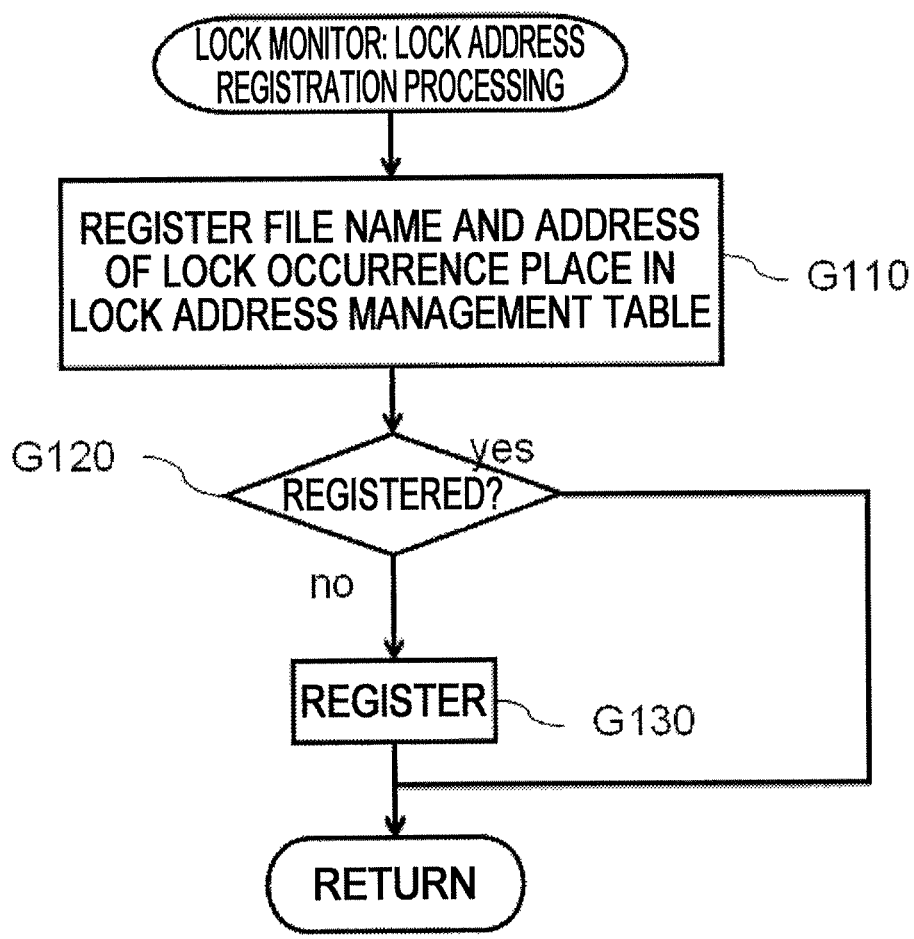
FIG. 6 is a flowchart of deadlock address registration processing of the lock monitor according to the embodiment of the present invention.

Deadlock address registration processing of the lock monitor 140 is explained below with reference to FIG. 6. This processing is started from the lock request processing of the lock monitor 140 explained above.

First, the lock monitor 140 registers a lock command place, i.e., a file name and an address of a lock occurrence place in the deadlock management table 153 (step G110). If an entry same as the file name and the address of the relevant lock occurrence place is already registered in the lock address management table 153, the lock monitor 140 does not perform redundant registration (step G120).

If the entry is not registered yet in step G120, the lock monitor 140 records the lock command place, i.e., the file name and the address of the lock occurrence place in the lock address management table 153 (step G130). Thereafter, the lock monitor 140 returns to the original processing.

Figure 7:
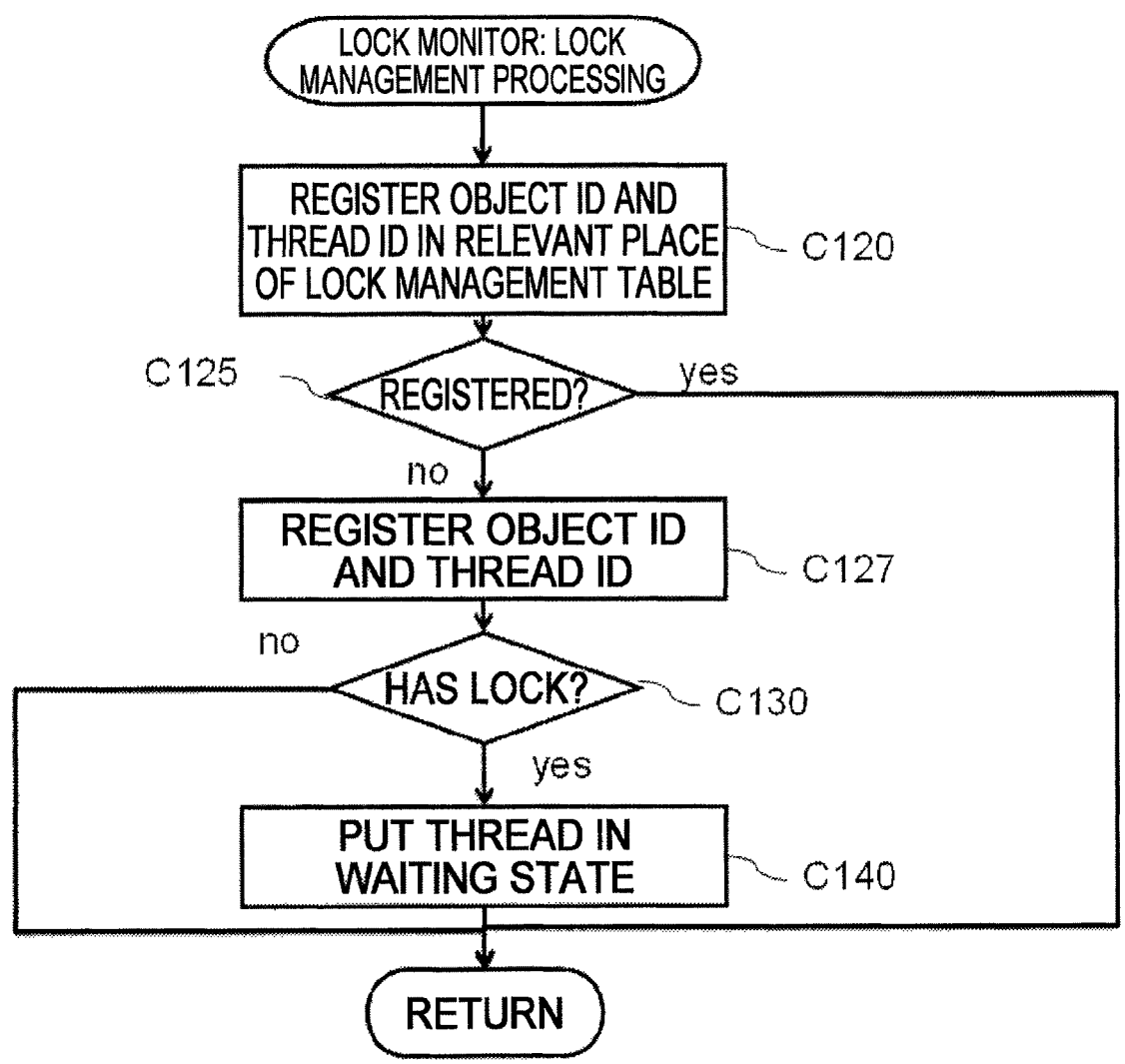
FIG. 7 is a flowchart of lock management processing of the lock monitor according to the embodiment of the present invention.

Lock management processing of the lock monitor 140 is explained below with reference to FIG. 7. This processing is started from the lock request processing (step A150) of the lock monitor 140 explained above.

First, the lock monitor 140 registers, in a relevant place of the lock management table 155, an ID of a lock target object and an ID of a thread that performs a lock request (step C120). Note that, if the same object ID and the same thread ID are already registered in the relevant place of the lock management table 155, the lock monitor 140 ends this processing and returns to the original processing (step C125). This step is necessary in the case of a programming language having a characteristic of not performing lock (synchronized) from the same thread to the same lock target object like java (registered trademark). However, in the case of a program language that takes another kind of lock even when a lock request is already performed with the same object ID and the same thread ID, the lock monitor 140 proceeds to step C127 without performing the condition determination processing in step C125.

The lock monitor 140 registers the lock target object ID and the thread ID in the lock management table 155 (step C127). That is, the lock monitor 140 adds the relevant thread ID to the tail end of a linear list of the relevant lock target object ID of the lock management table 155 shown in FIG. 21.

In the lock management table 155, a thread at the top of respective linear lists is a thread that acquires lock and the following threads are threads in a lock waiting state.

Subsequently, the lock monitor 140 determines, referring to the lock management table 155, whether another thread already has lock with respect to the lock target object ID (step C130). If another thread already has lock (yes), the lock monitor 140 puts the thread in a waiting state (step C140). The processing is kept stopped for the thread put in the waiting state unless the other thread unlocks the shared resources 110.

If another thread does not have lock in step C130, the lock monitor 140 changes to a lock acquired state and returns to the original processing.

Unlock processing of the lock monitor 140 is explained below with reference to FIG. 8. This processing is started from step Z150 of FIG. 3 explained above.

First, the lock monitor 140 acquires an ID of a thread that performs a lock request and an ID of a lock target object (step B110).

Subsequently, the lock monitor 140 removes the thread ID from a row of the ID of the relevant lock target object of the deadlock management table 153 (step B130). That is, the lock monitor 140 pops a lock target object stack included in an entry of the relevant thread ID and removes a set of the relevant lock target object ID and the relevant entry ID of the lock address table from the deadlock management table 153.

Subsequently, the lock monitor 140 performs, referring to the lock management table 155, unlock management processing for performing unlock (step B150).

Subsequently, the deadlock-graph creating section 356 performs unlock processing on the basis of information concerning the thread ID, the removed object ID, and the relevant entry ID of the lock address table (step B160).

Figure 9:
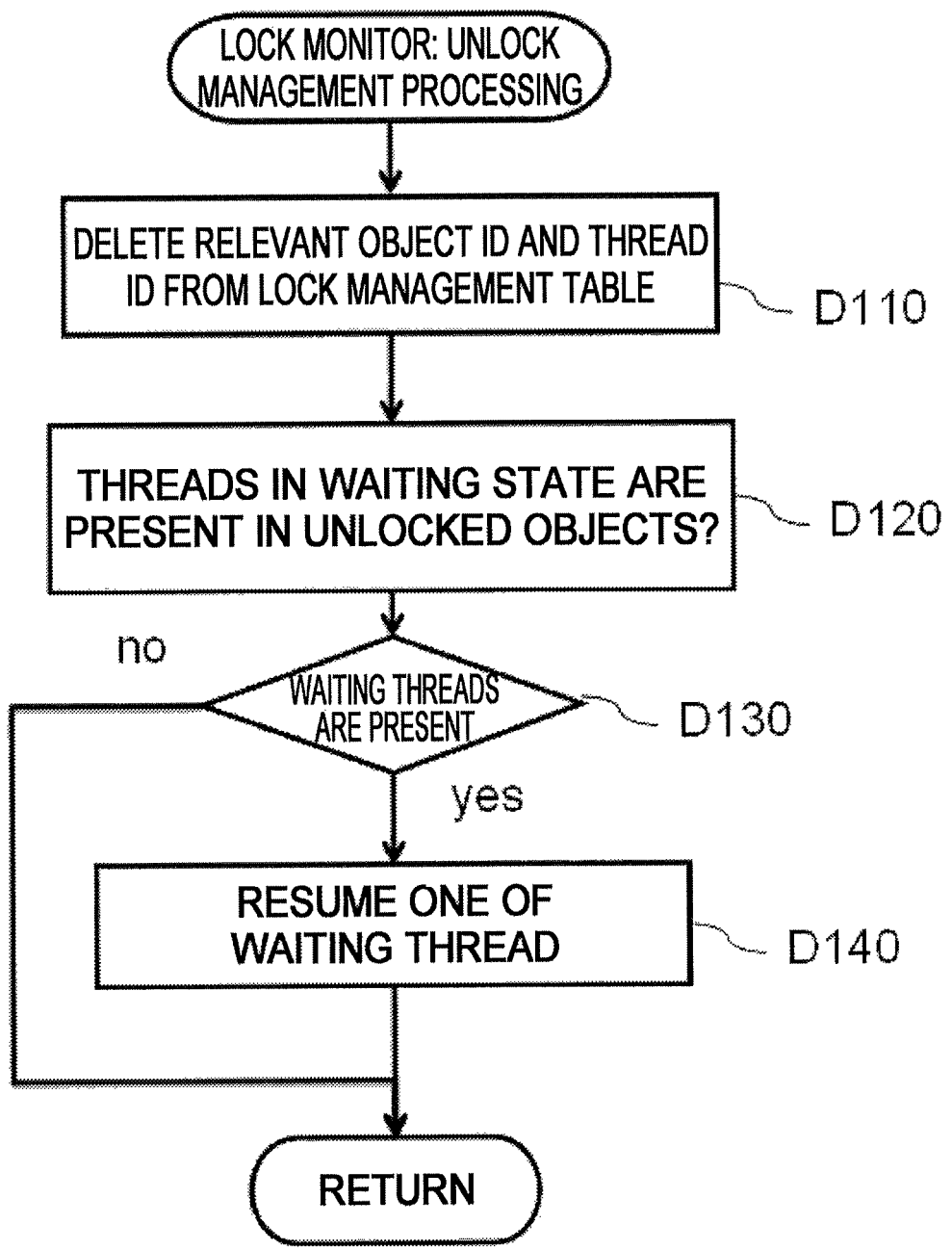
FIG. 9 is a flowchart of unlock management processing of the lock monitor according to the embodiment of the present invention.

Unlock management processing of the lock monitor 140 is explained below with reference to FIG. 9. This processing is started from the unlock processing (step B150) of the operation of the lock monitor 140 explained above.

First, the lock monitor 140 deletes the relevant lock target object ID and the relevant thread ID from the lock management table 155 (step D110). That is, the lock monitor 140 deletes the thread ID from a linear list included in an entry of the relevant object ID of the lock management table 155.

Subsequently, the lock monitor 140 checks, referring to the lock management table 155, whether threads in a waiting state in an unlocked object are present (step D120). If the following waiting threads are present (step D130: yes), the lock monitor 140 resumes one of the waiting threads and records the thread in a lock acquisition thread of the lock management table 155 (step D140).

That is, in steps D110 to D140, the lock monitor 140 removes the relevant ID of the thread currently acquiring lock from the entry of the relevant lock target object ID of the lock management table 155 and, if a thread waiting for lock with respect to the lock target object is present, sets the thread as a thread currently acquiring lock and starts the thread from a waiting state.

Lock processing of the deadlock-graph creating section 356 is explained below with reference to FIG. 10. This processing is started from step E140 configuring the deadlock management processing of the lock monitor 140 shown in FIG. 5.

First, the deadlock-graph creating section 356 acquires, referring to the deadlock management table 153, an ID of a lock target object locked anew and an ID of a thread that performs a lock request (step M110).

Subsequently, the deadlock-graph creating section 356 checks, referring to a lock target object stack of the relevant thread ID of the deadlock management table 153, whether an object ID same as a new lock target object is present (step M120). If the relevant lock target object is absent (step M130: no), the deadlock-graph creating section 356 returns to the original processing. When the relevant lock target object is present (step M130: yes), the deadlock-graph creating section 356 sets an element of a matrix indicated by a row of a deadlock graph matrix (a lock target object immediately preceding the new lock target object. A row indicated by a node ID second from the top of a lock target object stack corresponding to the relevant thread ID) and a column (the new lock target object. A column indicated by a node ID at the top of the lock target object stack corresponding to the thread ID) (step M140).

Subsequently, the deadlock-graph creating section 356 searches for the relevant thread ID referring to the deadlock graph thread table (step M150). When the relevant thread ID is present (step M160: yes), the deadlock-graph creating section 356 acquires a relevant sequence ID of the deadlock graph thread table (step M180). When the relevant thread ID is present (step M160: no), the deadlock-graph creating section 356 creates a new row in the deadlock graph thread table and returns a sequence ID of the row (step M170).

That is, the deadlock-graph creating section 356 generates a new sequence ID and records, in the deadlock graph thread table, a set of three items, i.e., the sequence ID, an ID of a lock request thread, and reference to a matrix element of the deadlock graph matrix 157, which is an element having a value set to 1 in step M140. The deadlock-graph creating section 356 returns the sequence ID generated anew.

Subsequently, the deadlock-graph creating section 356 acquires row IDs in the lock address table 159 of a lock target object recorded in a lock target object stack and an immediately preceding lock target object and adds, to a deadlock graph side attribute table corresponding to the element of the deadlock graph matrix 157 having the value set to 1 in step M140, a set of three items, i.e., the sequence ID and the row IDs of the preceding lock target object and the new lock target (step M190).

Figure 11:
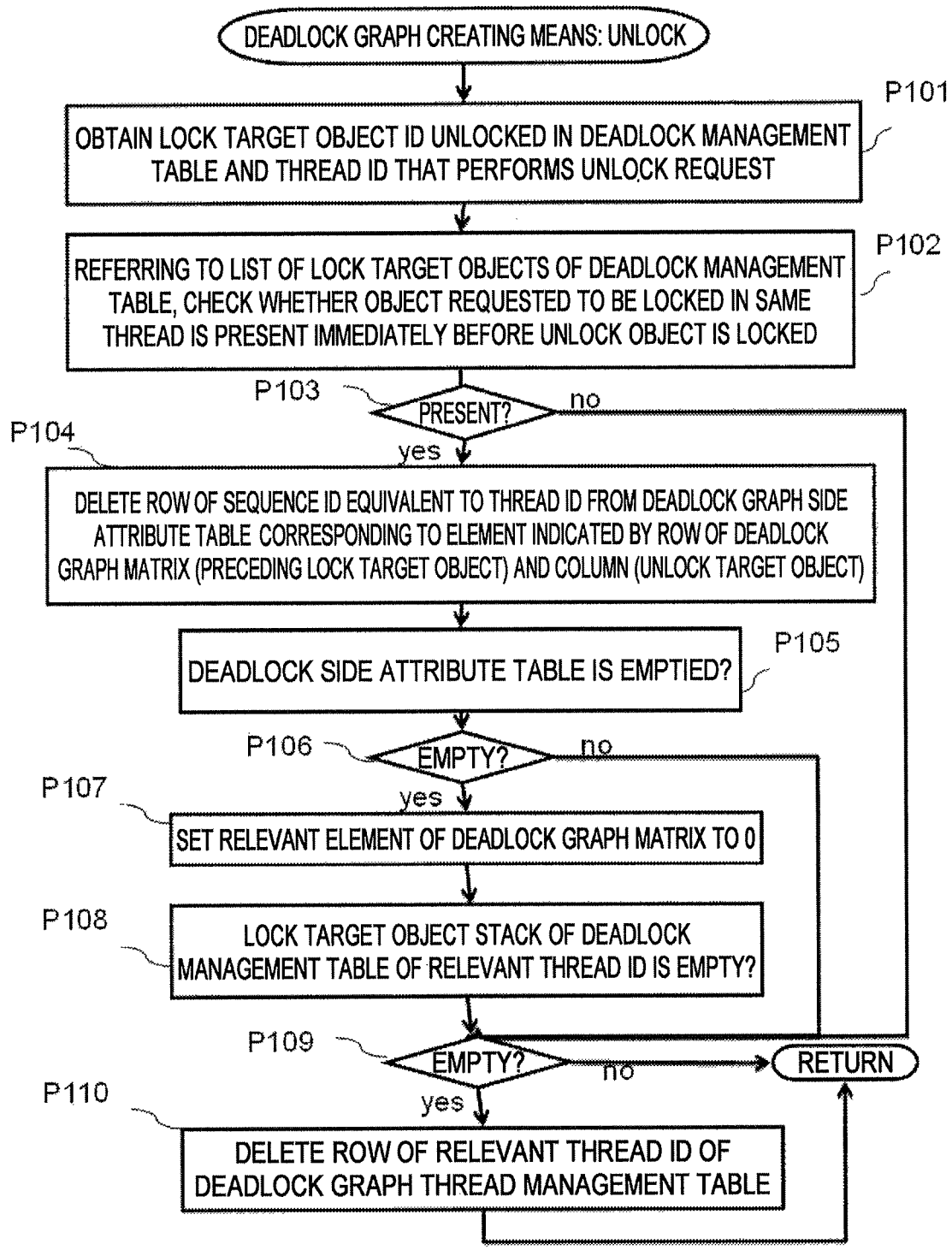
FIG. 11 is a flowchart of unlock processing of the deadlock graph creating section according to the first embodiment of the present invention.

The operation of the unlock processing of the deadlock-graph creating section 356 is explained below with reference to FIG. 11. This processing is started from step E140 configuring the unlock processing of the lock monitor 140 shown in FIG. 5.

First, the deadlock-graph creating section 356 acquires an ID of an unlocked lock target object and an ID of a thread that performs an unlock request (step P101).

Subsequently, the deadlock-graph creating section 356 checks, referring to a list of lock target objects of the deadlock management table 153, an object requested to be locked in the same thread is present immediately before an unlocked object is locked (step P102).

When an object requested to be locked in the same thread is present (step P103: yes), the deadlock-graph creating section 356 shifts to step P104. When an object requested to be locked in the same thread is absent, the deadlock-graph creating section 356 shifts to step P108.

In step P104, the deadlock-graph creating section 356 deletes a row of a sequence ID equivalent to the thread ID from a deadlock graph side attribute table corresponding to an element indicated by a row (a preceding lock target object) and a column (an unlock target object) of the deadlock graph matrix 157.

Subsequently, the deadlock-graph creating section 356 determines whether the deadlock graph side attribute table is emptied (steps P105 and P106). When the deadlock graph side attribute table is empty, the deadlock-graph creating section 356 proceeds to step P107. When the deadlock graph side attribute table is not empty, the deadlock-graph creating section 356 shifts to step P108.

In step P107, the deadlock-graph creating section 356 sets the relevant element of the deadlock graph matrix 157 to 0.

Subsequently, the deadlock-graph creating section 356 searches for a lock target object stack corresponding to an ID of an unlock requesting thread among lock target object stacks of the deadlock management table 153 and checks whether the lock target object stack is empty (step P108). If the lock target object stack is not empty (step P109: no), the deadlock-graph creating section 356 returns to the original processing. If the lock target object stack is empty (step P109: yes), the deadlock-graph creating section 356 deletes a row of an ID of a thread that requests unlock from the deadlock graph thread management table (step P110).

Figure 12:
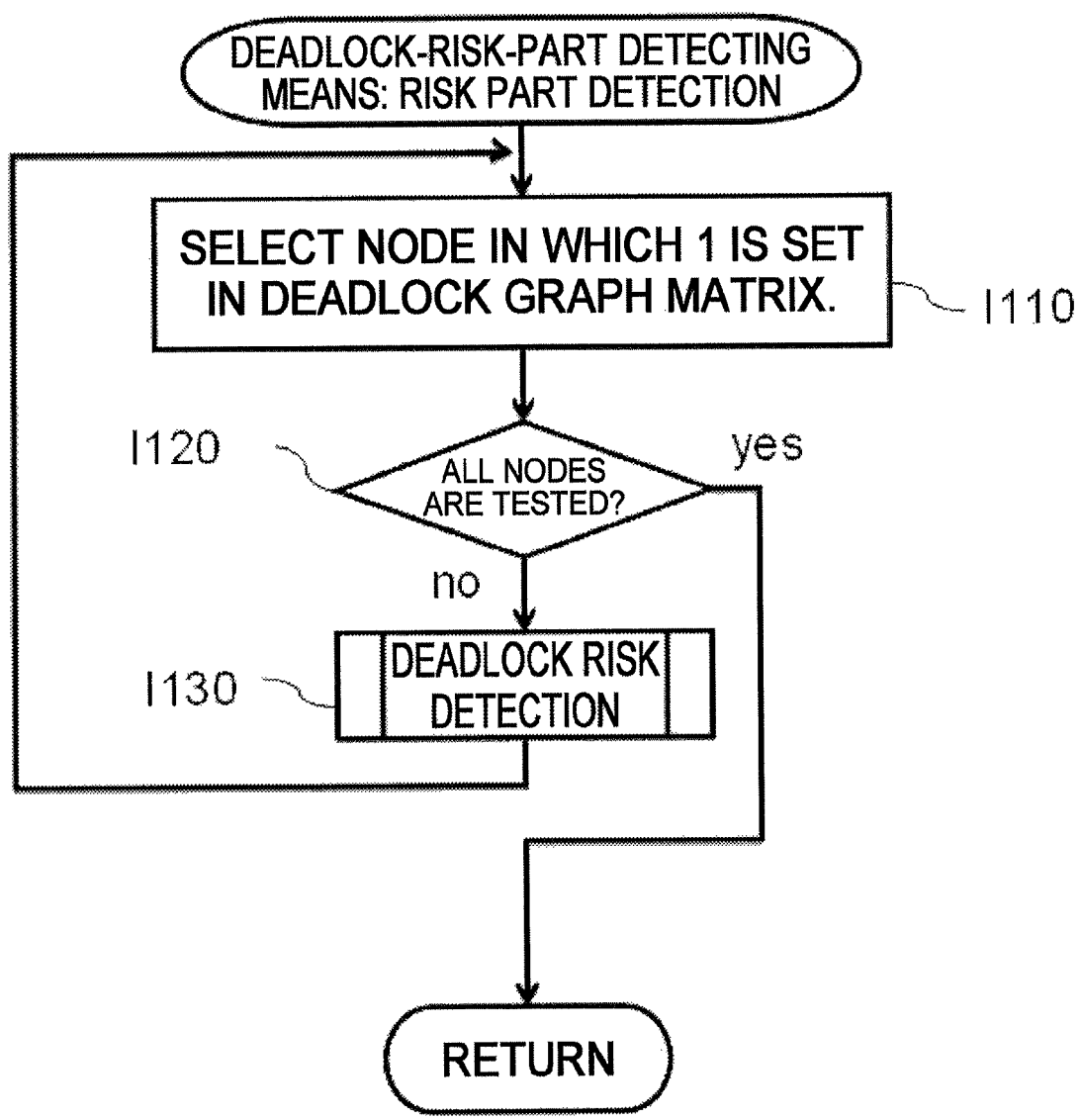
FIG. 12 is a flowchart of risk part detection processing of a deadlock-risk-part detecting section according to the embodiment of the present invention.

Deadlock part detection processing of the deadlock detecting section 360 is explained below with reference to FIG. 12. This operation is started periodically or at appropriate timing.

First, the deadlock detecting section 360 select one matrix element in which 1 is set in the deadlock graph matrix 157 (step 1110). When all nodes are already selected (step 1120: yes), the deadlock detecting section 360 ends the processing. In other cases (step 1120: no), the deadlock detecting section 360 performs deadlock risk detection processing explained below (step 1130). Thereafter, the deadlock detecting section 360 returns to step 1110 and repeats the processing.

Figure 13:
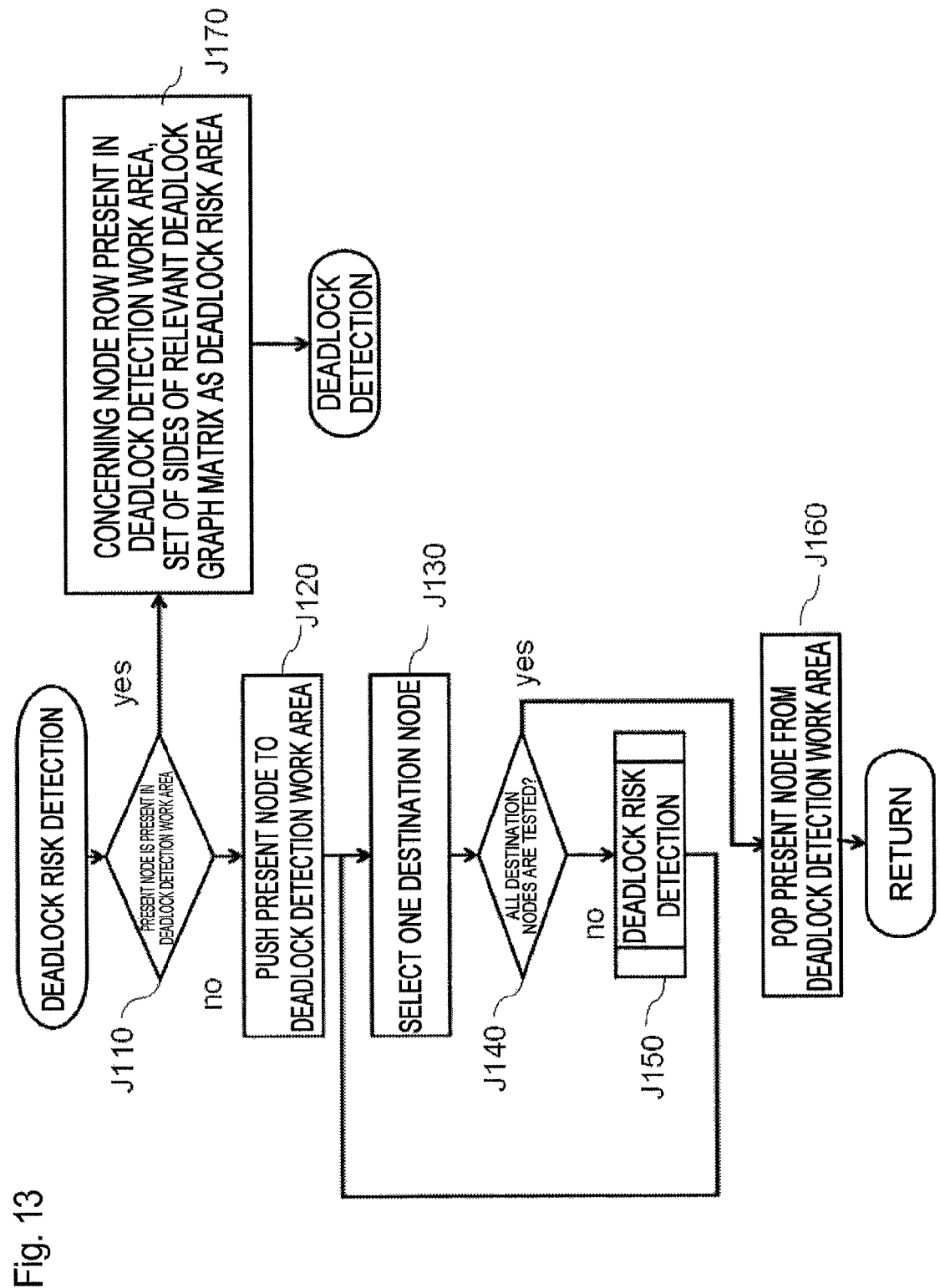
FIG. 13 is a flowchart of deadlock risk detection processing of the deadlock-risk-part detecting section according to the embodiment of the present invention.

Deadlock detection processing of the deadlock detecting section 360 is explained below with reference to FIG. 13. This processing is invoked from the risk part detection processing (step 1130) of the deadlock detecting section 360 explained above. Alternatively, this processing is recursively invoked from the processing. In that case, a test target row of the deadlock graph matrix 157, i.e., one of start nodes (lock target objects) of a directed side configuring a graph is passed as an argument.

First, the deadlock detecting section 360 sets the start node as a present node. If the present node is recorded in the deadlock detection work area 165 (step J110: yes), the deadlock detecting section 360 acquires a node row including a node already stored in the deadlock detection work area 165 and up to a node stored in the deadlock detection work area 165 after the node. Further, the deadlock detecting section 360 sets a relevant place of the deadlock graph matrix 157 corresponding to the node row as a deadlock risk area (step J170).

The processing is explained using an example shown in FIG. 14. When it is attempted to push $V_4$ to the deadlock detection work area anew, $V_4$ is already present in the deadlock detection work area. At this point, elements of $(V_4, V_1)$, $(V_1, V_3)$, and $(V_3, V_4)$ of the deadlock graph matrix 157 are deadlock risk parts. After step J170, the deadlock detecting section 360 returns to the original processing.

When the present node is not recorded in the deadlock detection work area 165 in step J110, the deadlock detecting section 360 pushes an ID of the present node to the deadlock detection work area (step J120).

Subsequently, the deadlock detecting section 360 selects a column in which 1 is set among relevant rows of the present node in the deadlock graph matrix 157 (step J130). If all destination nodes are already tested concerning the column in which 1 is set (step J140: yes), the deadlock detecting section 360 extracts information concerning the present node pushed to the deadlock detection work area (step J160) and returns from this processing to the original processing.

When an untested node is present in step J140 (no), the deadlock detecting section 360 sets a node ID indicated by one of columns in which 1 is set as a present node ID and an argument and recursively invokes the deadlock detection processing (step J150).

Figure 15:
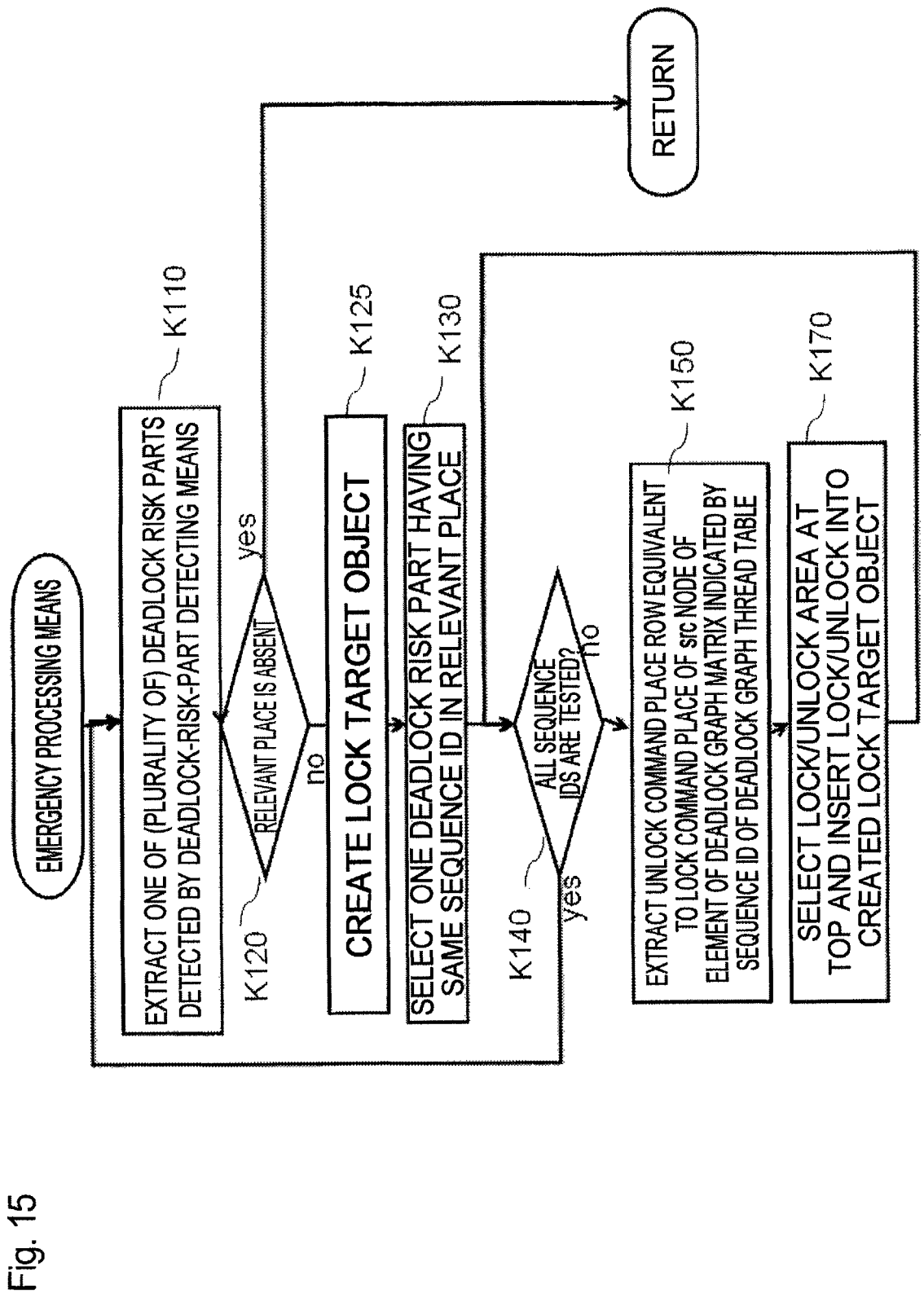
FIG. 15 is a flowchart of the operation of an emergency processing section according to the embodiment of the present invention.

The operation of the emergency processing section 180 is explained below with reference to FIG. 15. The processing is applied to a deadlock risk part selected by the administrator via the GUI 170 among deadlock risk parts found by the deadlock detecting section 360.

First, the emergency processing section 180 extracts one of a plurality of deadlock parts detected by the deadlock detecting section 360 (step K110). The deadlock detecting section 360 extracts deadlock risk parts, for example, "$(V_4, V_1)$, $(V_1, V_3)$, and $(V_3, V_4)$" and acquires, referring to a deadlock graph matrix side attribute table of respective sides of $(V_4, V_1)$ and the like, a plurality of sets of a plurality of lock command places referred to by a set of a sequence ID for each side and a row ID of the lock address table 159 for each side.

If emergency processing is already performed for all the deadlock risk parts (step K120: yes), the emergency processing section 180 returns to the original processing. When a deadlock risk area not subjected to the emergency processing yet is present (no), the emergency processing section 180 creates new lock target object V (step K125).

In step K110, the emergency processing section 180 extracts one out of a plurality of sequence IDs corresponding to the acquired deadlock risk part and extracts a subset of deadlock risk parts corresponding to the sequence ID (step K130).

When the processing is completed for all the sequence IDs (step K140: yes), the emergency processing section 180 returns to step K110 and applies the processing to the other deadlock parts.

When an unprocessed sequence ID is present (step K140: no), the emergency processing section 180 extracts a row of the relevant sequence ID of the deadlock class thread table and acquires, referring to the lock address table 159, a lock command place of an src node of a row of the relevant ID in a deadlock graph side attribute table of an element of a deadlock graph matrix indicated by the row. Further, the emergency processing section 180 searches through the program code 190 and acquires an unlock relevant place corresponding to the lock command place (step K150).

Concerning a top lock command place and an unlock command place corresponding to the top lock command place, the emergency processing section 180 inserts, into a relevant file, a lock request command and an unlock command targeting the lock target object V (step K170).

Figure 22:
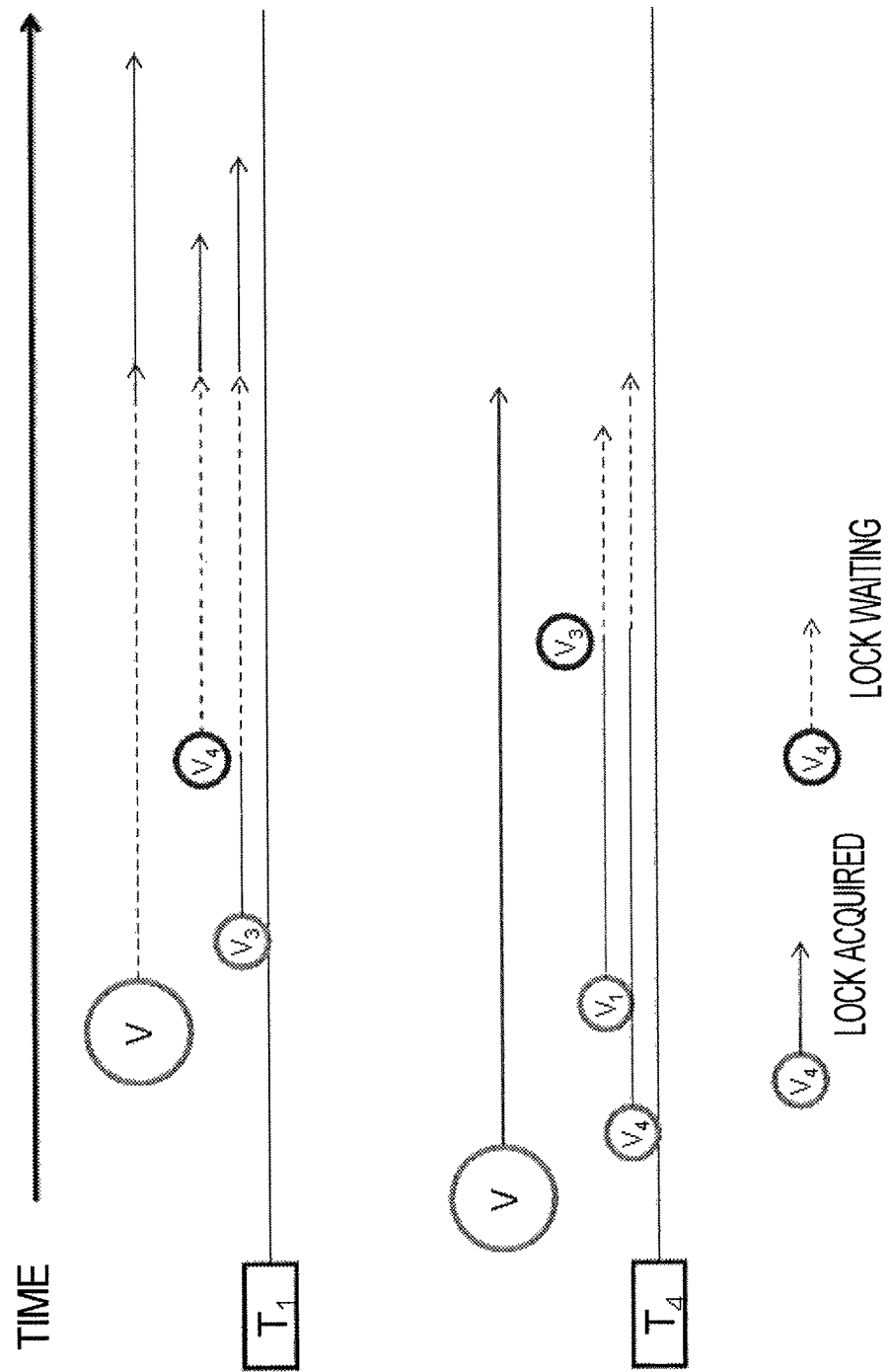
FIG. 22 is a diagram showing a time sequence of lock and unlock command issuance according to the embodiment of the present invention.
Figure 23:
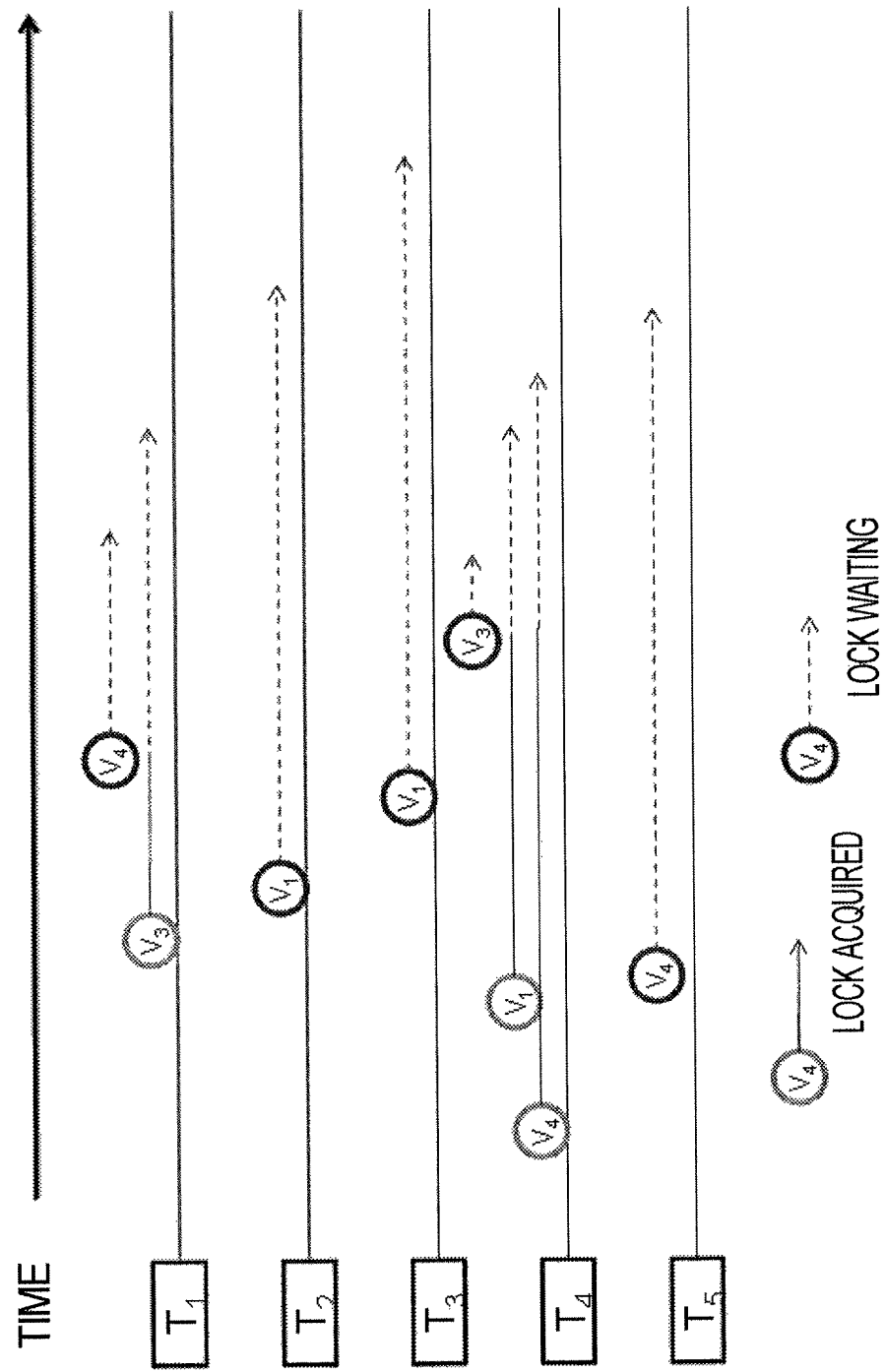
FIG. 23 is a diagram showing a time sequence of lock and unlock command issuance according to the embodiment of the present invention.

That is, the emergency processing section 180 creates a cock command to include a lock and unlock command that causes a deadlock. Therefore, it is possible to prevent a deadlock. A time sequence of lock and unlock command issuance is shown in FIG. 22. For simplification, in FIG. 22, $T_2$, $T_3$, and $T_5$ unrelated to a deadlock are removed from FIG. 23 showing an example in which the deadlock occurs. In FIG. 22, a lock command and an unlock command for the lock target object V are inserted into $T_1$ and $T_4$ in FIG. 23. Consequently, $T_4$ causes $T_1$ to wait for lock and a series of operation can be executed. Therefore, it is possible to prevent a deadlock.

Since a new lock target object V is generated separately from an existing lock target object, a situation does not occur in which lock with respect to the lock target object V interferes with existing lock and causes a new deadlock. When the processing in step K170 ends, the emergency processing section 180 returns to step K140 and performs a test of the next thread.

As explained above, according to the present embodiment, the emergency processing section 180 rewrites the program code 190 with respect to a deadlock place detected by the deadlock detecting section 360 and inserts lock and unlock for encompassing a deadlock risk part into the program code 190. Therefore, it is possible to prevent the next deadlock.

It is possible to avoid a deadlock even if a function for deadlock avoidance is not imparted to the application programs 120 and 130. This is because the emergency processing section 180 rewrites a deadlock risk place in the application programs and inserts a lock command into a deadlock risk part. The insertion of the code is performed by the emergency processing section 180. Therefore, it is unnecessary to rewrite the application programs per se.

Second Embodiment

Figure 2:
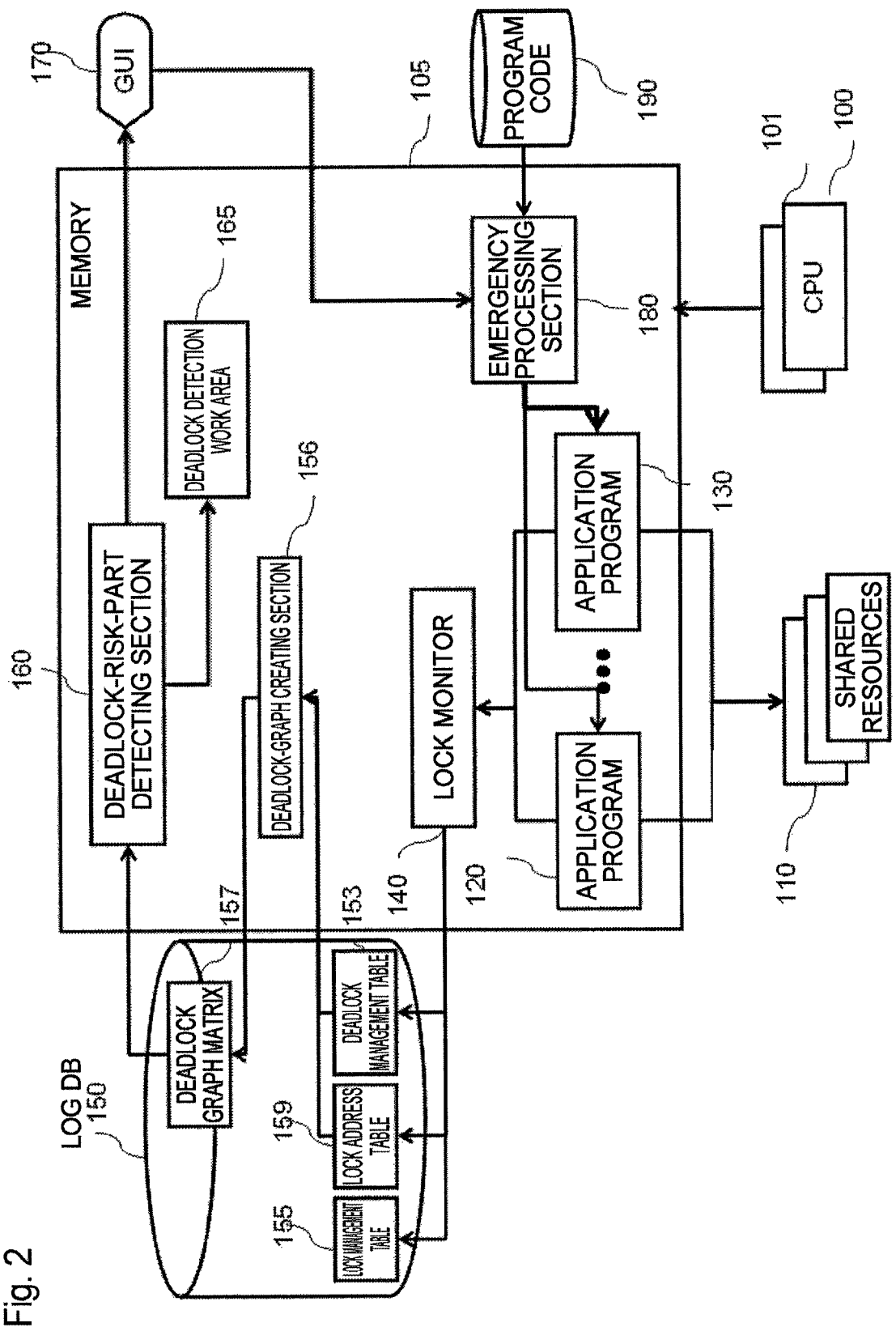
FIG. 2 is a block diagram showing the configuration of a deadlock preventing apparatus according to a second embodiment of the present invention.

FIG. 2 is a block diagram showing the configuration of a deadlock preventing apparatus according to a second embodiment of the present invention. As shown in the figure, the deadlock preventing apparatus according to the embodiment of the present invention includes the singularity or the plurality of CPUs 100 and 101 configured to operate according to program control, the plurality of application programs 120 and 130, the shared resources 110 accessed by the plurality of application programs 120 and 130, the lock monitor 140 configured to control the order of access to the shared resources 110, the log DB 150 for recording a state of lock managed by the lock monitor 140, a deadlock-risk-part detecting section (a deadlock-occurrence-position detecting section) 160 configured to detect a deadlock on the bass of information recorded in the log DB 150, the GUI 170 for informing an administrator of an occurrence situation of a deadlock, the program code 190 of the application programs 120 and 130, the emergency processing section 180 configured to embed a code for preventing a deadlock in the program code 190 of the application programs 120 and 130 concerning a place designated and approved by the administrator via the GUI 170 among detected deadlock risk parts, and the memory 105 configured to store programs for the lock monitor 140, the deadlock-risk-part detecting section 160, and the like.

In the log DB 150, the lock management table 155 indicating a lock acquisition situation, the deadlock management table 153, the deadlock graph matrix 157, which is a work area for detecting a deadlock, and the lock address table 159 for recording an occurrence place of a lock request on an application program are stored. In the memory 105, a deadlock-graph creating section 156 configured to generate the deadlock graph matrix 157 from the deadlock management table 153 is stored.

The lock management table 155 is, for example, as shown in FIG. 19, a table for managing IDs of threads, which perform lock requests, as a linear list with a lock target object ID set as a key. A thread corresponding to a thread ID registered first among the thread IDs on the linear list is a thread that acquires lock with respect to the lock target object. The other threads on the linear list are lock waiting threads.

The lock address table 159 is, for example, as shown in FIG. 20, a table for recording a row ID (#) and a file name and an address, which are lock command places on the program code 190.

The deadlock management table 153 is configured by, for example, as shown in FIG. 16, a deadlock management table main body and a lock target object stack. A main body of the deadlock management table 153 is a table for managing the lock target object stack with an ID of a thread, which performs a lock request, set as a key. The lock target object stack is a stack for retaining a set of an ID of a lock target object, for which the thread issues a lock request, and a row ID indicating a lock command place recorded in the lock address table 159.

The deadlock graph matrix 157 is configured by, for example, as shown in FIG. 17, a deadlock graph matrix main body, a deadlock graph thread table, and a deadlock graph side attribute table present for each matrix element of the deadlock graph matrix main body. The deadlock graph matrix 157 shown in FIG. 17 has a value same as a value of a deadlock graph shown in FIG. 18. The deadlock graph matrix main body indicates a history of a plurality of lock requests performed by the same thread. For example, when a thread T requests lock of $V_4$ and requests lock of $V_1$ before unlocking $V_4$, an element of the row $V_4$ and the column $V_1$ of the deadlock graph matrix is 1.

The deadlock graph thread table is a table for managing, with a sequence ID, which is an ID given to each row, set as a key, when the same thread acquires a plurality of times of lock, a top pointer to a matrix element of the deadlock graph matrix main body indicating a top of the lock and an ID of a thread currently requesting lock. However, when the thread unlocks all locked objects, a value of a column of "thread ID" is rewritten from the thread ID to "ended".

The deadlock graph side attribute table is a table for managing, with the sequence ID of the deadlock graph thread table set as a key, a row ID of a lock address table in which a lock request place of an object "src" requested by a thread to be locked earlier is recorded and a row ID of the lock address table in which a lock request place of an object "dest" requested to be locked by the thread next is recorded.

For example, a case in which the thread T is recorded in the sequence ID 1 of the deadlock graph thread table and performs a lock request of $V_1$ to $V_3$ is explained as an example. When a row ID of the lock address table 159 in which the lock request place where the lock quest to $V_1$ is issued is recorded is represented as #2 and a row ID of the lock address table 159 in which a lock request place where a lock request to $V_3$ is issued is recorded is represented as #6, a row {sequence ID=1, src=#2, dest=#6} is recorded in the deadlock graph side attribute table corresponding to a matrix element of ($V_1$, $V_3$).

The deadlock detection work area 165 is, as shown in FIG. 14, a stack for storing a lock target object.

The operation of the deadlock preventing apparatus is explained below.

The application programs 120 and 130 are programs for providing a system user with a service. In this embodiment, the application programs 120 and 130 are deadlock detection target programs. Note that, in the application programs, a plurality of threads operate in parallel.

The lock monitor 140 receives lock requests from the application programs 120 and 130. When accessing the shared resources 110, the application programs 120 and 130 request lock in order to avoid a situation in which consistency cannot be maintained due to the influence from the other applications. The lock monitor 140 receives the requests and records the lock requests in the lock management table 155, the deadlock management table 153, and the lock address table 159. Further, according to a situation, the lock monitor 140 permits the lock or puts a thread, which requests the lock, in a waiting state.

The deadlock-graph creating section 156 reads a state of lock recorded in the deadlock management table 153 and records a history of lock requests in the deadlock graph matrix 157. The deadlock graph matrix 157 is a work area for detecting a risk of a deadlock.

The deadlock-risk-part detecting section 160 detects a closed graph on the deadlock graph referring to the deadlock graph matrix 157 to detect a deadlock risk part and displays the deadlock risk part on the GUI 170.

The emergency processing section 180 reads the program code 190, rewrites a program part equivalent to a risk place where a deadlock detected by the deadlock-risk-part detecting section 160 occurs, and replaces the application programs 120 and 130.

The operation of the deadlock preventing apparatus according to this embodiment is explained in detail below with reference to FIG. 3.

First, the application program 120 receives a request for processing execution (step Z110).

Subsequently, the application program 120 executes a service in response to the request (step Z120).

During the execution of the application program, if it is necessary to access the shared resources 110, the application program 120 requests the lock monitor 140 to give lock (step Z130).

Upon acquiring the lock, the application program 120 executes the service (step Z140).

When the shared resources 110 become unnecessary, the application program 120 notifies the lock monitor 140 of unlock (step Z150).

The application program 120 continues to execute the service (step Z160).

When a sequence of processing is completed, the application program 120 returns a response (step Z170). Further, returning to step Z110, the application program 120 receives a request.

Lock request processing of the lock monitor 140 is explained in detail below with reference to FIG. 4.

First, the lock monitor 140 acquires an ID of a thread that performs a lock request, an ID of a lock target object, and a file name and an address (e.g., a row number) in a file in which a lock command is executed (step A120). Note that, in the following explanation, the file name and the address (e.g., the row number) in the file in which the lock command is executed are referred to as lock command place.

Subsequently, the lock monitor 140 performs, in order to detect a risk of a deadlock, deadlock management processing for recording lock information in the deadlock management table 153 (step A130). Subsequently, the lock monitor 140 performs lock address registration processing for recording a place where a lock command is generated (step A140).

Subsequently, the lock monitor 140 performs lock management processing for recording the lock information in the lock management table 155 (step A150).

Deadlock management processing of the lock monitor 140 is explained below with reference to FIG. 5. This processing is started from the lock request processing (step A130) of the lock monitor 140.

First, the deadlock monitor 140 registers, in the deadlock management table 153, three sets of data, i.e., an object ID, a thread ID, a relevant row ID of the lock address table 159 in which a lock command place is recorded (step E110). However, if the relevant row is already registered, the lock monitor 140 ends the processing without registering the ID (step E120). For example, in the case of a language for not performing lock (in the case of java (registered trademark), synchronized) from the same thread to the same lock target object like java (registered trademark), step E120 is necessary. The same applies to steps C125 and step G120 explained below.

If the relevant row is not registered yet in step E120, the lock monitor 140 registers, in the deadlock management table 153, a lock target object ID, a thread ID, and an entry ID of a relevant row of the lock address table 159 in which the lock request place is registered (step E130). That is, the lock monitor 140 pushes and records a set of the lock target object ID and the relevant row ID of the lock address table 159 in a lock target object stack present in an entry of the relevant thread ID of the lock management table 153.

Further, the deadlock-graph creating section 156 records the relevant object ID and the registered lock target object ID in the deadlock graph matrix 157 (step E140).

Deadlock address registration processing of the lock monitor 140 is explained below with reference to FIG. 6. This processing is started from the lock request processing of the lock monitor 140 explained above.

First, the lock monitor 140 registers a lock command place, i.e., a file name and an address of a lock occurrence place in the deadlock management table 153 (step G110). If an entry same as the file name and the address of the relevant lock occurrence place is already registered in the lock address management table 153, the lock monitor 140 does not perform redundant registration (step G120).

If the entry is not registered yet in step G120, the lock monitor 140 records the lock command place, i.e., the file name and the address of the lock occurrence place in the lock address management table 153 (step G130). Thereafter, the lock monitor 140 returns to the original processing.

Lock management processing of the lock monitor 140 is explained below with reference to FIG. 7. This processing is started from the lock request processing (step A150) of the lock monitor 140 explained above.

First, the lock monitor 140 registers, in a relevant place of the lock management table 155, an ID of a lock target object and an ID of a thread that performs a lock request (step C120). Note that, if the same object ID and the same thread ID are already registered in the relevant place of the lock management table 155, the lock monitor 140 ends this processing and returns to the original processing (step C125). This step is necessary in the case of a programming language having a characteristic of not performing lock (synchronized) from the same thread to the same lock target object like java (registered trademark). However, in the case of a program language that takes another kind of lock even when a lock request is already performed with the same object ID and the same thread ID, the lock monitor 140 proceeds to step C127 without performing the condition determination processing in step C125.

The lock monitor 140 registers the lock target object ID and the thread ID in the lock management table 155 (step C127). That is, the lock monitor 140 adds the relevant thread ID to the tail end of a linear list of the relevant lock target object ID of the lock management table 155 shown in FIG. 21.

In the lock management table 155, a thread at the top of respective linear lists is a thread that acquires lock and the following threads are threads in a lock waiting state.

Subsequently, the lock monitor 140 determines, referring to the lock management table 155, whether another thread already has lock with respect to the lock target object ID (step C130). If another thread already has lock (yes), the lock monitor 140 puts the thread in a waiting state (step C140). The processing is kept stopped for the thread put in the waiting state unless the other thread unlocks the shared resources 110. If another thread does not have lock in step C130, the lock monitor 140 changes to a lock acquired state and returns to the original processing.

Unlock processing of the lock monitor 140 is explained below with reference to FIG. 8. This processing is started from step Z150 of FIG. 3 explained above.

First, the lock monitor 140 acquires an ID of a thread that performs a lock request and an ID of a lock target object (step B110).

Subsequently, the lock monitor 140 removes the thread ID from a row of the ID of the relevant lock target object of the deadlock management table 153 (step B130). That is, the lock monitor 140 pops a lock target object stack included in an entry of the relevant thread ID and removes a set of the relevant lock target object ID and the relevant entry ID of the lock address table from the deadlock management table 153.

Subsequently, the lock monitor 140 performs, referring to the lock management table 155, unlock management processing for performing unlock (step B150).

Subsequently, the deadlock-graph creating section 156 performs unlock processing on the basis of information concerning the thread ID, the removed object ID, and the relevant entry ID of the lock address table (step B160).

Unlock management processing of the lock monitor 140 is explained below with reference to FIG. 9. This processing is started from the unlock processing (step B150) of the operation of the lock monitor 140 explained above.

First, the lock monitor 140 deletes the relevant lock target object ID and the relevant thread ID from the lock management table 155 (step D110). That is, the lock monitor 140 deletes the thread ID from a linear list included in an entry of the relevant object ID of the lock management table 155.

Subsequently, the lock monitor 140 checks, referring to the lock management table 155, whether threads in a waiting state in an unlocked object are present (step D120). If the following waiting threads are present (step D130: yes), the lock monitor 140 resumes one of the waiting threads and records the thread in a lock acquisition thread of the lock management table 155 (step D140).

That is, in steps D110 to D140, the lock monitor 140 removes the relevant ID of the thread currently acquiring lock from the entry of the relevant lock target object ID of the lock management table 155 and, if a thread waiting for lock with respect to the lock target object is present, sets the thread as a thread currently acquiring lock and starts the thread from a waiting state.

Lock processing of the deadlock-graph creating section 156 is explained below with reference to FIG. 10. This processing is started from step E140 configuring the deadlock management processing of the lock monitor 140 shown in FIG. 5.

First, the deadlock-graph creating section 156 acquires, referring to the deadlock management table 153, an ID of a lock target object locked anew and an ID of a thread that performs a lock request (step M110).

Subsequently, the deadlock-graph creating section 156 checks, referring to a lock target object stack of the relevant thread ID of the deadlock management table 153, whether an object ID same as a new lock target object is present (step M120). If the relevant lock target object is absent (step M130: no), the deadlock-graph creating section 156 returns to the original processing. When the relevant lock target object is present (step M130: yes), the deadlock-graph creating section 156 sets an element of a matrix indicated by a row of a deadlock graph matrix (a lock target object immediately preceding the new lock target object. A row indicated by a node ID second from the top of a lock target object stack corresponding to the relevant thread ID) and a column (the new lock target object. A column indicated by a node ID at the top of the lock target object stack corresponding to the thread ID) (step M140).

Subsequently, the deadlock-graph creating section 156 searches for the relevant thread ID referring to the deadlock graph thread table (step M150). When the relevant thread ID is present (step M160: yes), the deadlock-graph creating section 156 acquires a relevant sequence ID of the deadlock graph thread table (step M180). When the relevant thread ID is present (step M160: no), the deadlock-graph creating section 156 creates a new row in the deadlock graph thread table and returns a sequence ID of the row (step M170).

That is, the deadlock-graph creating section 156 generates a new sequence ID and records, in the deadlock graph thread table, a set of three items, i.e., the sequence ID, an ID of a lock request thread, and reference to a matrix element of the deadlock graph matrix 157, which is an element having a value set to 1 in step M140. The deadlock-graph creating section 156 returns the sequence ID generated anew.

Subsequently, the deadlock-graph creating section 156 acquires row IDs in the lock address table 159 of a lock target object recorded in a lock target object stack and an immediately preceding lock target object and adds, to a deadlock graph side attribute table corresponding to the element of the deadlock graph matrix 157 having the value set to 1 in step M140, a set of three items, i.e., the sequence ID and the row IDs of the preceding lock target object and the new lock target (step M190).

Figure 24:
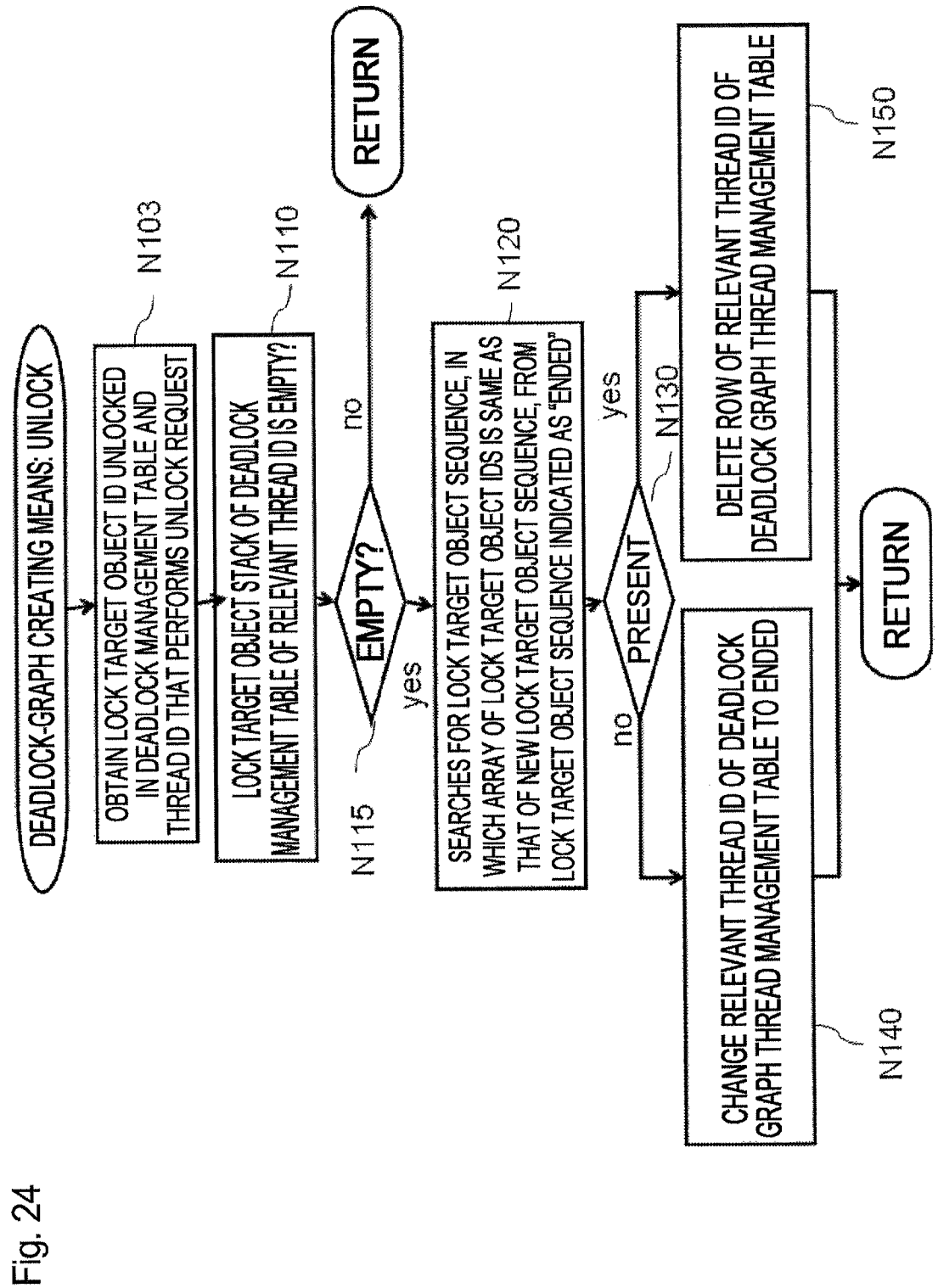
FIG. 24 is a flowchart of unlock processing of a deadlock graph creating section according the second embodiment of the present invention.

The operation of the unlock processing of the deadlock-graph creating section 156 is explained below with reference to FIG. 24. This processing is started from step E140 configuring the unlock processing of the lock monitor 140 shown in FIG. 5.

First, the deadlock-graph creating section 156 acquires an ID of an unlocked lock target object and an ID of a thread that performs an unlock request (step N103).

Subsequently, the deadlock-graph creating section 156 searches through a lock target object stack corresponding to the ID of the unlock requesting thread among the lock target object stacks of the deadlock management table 153 and checks whether the lock target object stack is empty (step N110). If the lock target object is not empty (step N115: no), the deadlock-graph creating section 156 returns to the original processing. If the lock target object stack is empty (step N115: yes), the deadlock-graph creating section 156 searches through the deadlock graph thread management table and the deadlock graph matrix 157 and acquires a sequence of lock target objects acquired by the ID of the thread that requests the unlock command.

The sequence of IDs of the lock target objects is referred to as new lock target object sequence. The deadlock-graph creating section 156 searches for a lock target object sequence, in which an array of lock target object IDs is the same as that of a new lock target object sequence, from lock target object sequence indicated as "ended" in a column of a thread ID in the deadlock graph matrix 157 (step N120).

If the relevant lock target object sequence is present (step N130: yes), the deadlock-graph creating section 156 deletes a row of the ID of the thread that performs the unlock request from the deadlock graph thread management table (step N150). If the relevant lock target object sequence is absent (step N130: no), the deadlock-graph creating section 156 changes the relevant thread ID of the deadlock graph thread management table to "ended" (step N140).

Risk part detection processing of the deadlock-risk-part detecting section 160 is explained below with reference to FIG. 12. This operation is started periodically or at appropriate timing.

First, the deadlock-risk-part detecting section 160 select one matrix element in which 1 is set in the deadlock graph matrix 157 (step 1110). When all nodes are already selected (step 1120: yes), the deadlock-risk-part detecting section 160 ends the processing. In other cases (step 1120: no), the deadlock-risk-part detecting section 160 performs deadlock risk detection processing explained below (step 1130). Thereafter, the deadlock-risk-part detecting section 160 returns to step 1110 and repeats the processing.

Deadlock risk detection processing of the deadlock-risk-part detecting section 160 is explained below with reference to FIG. 13. This processing is invoked from the risk part detection processing (step 1130) of the deadlock-risk-part detecting section 160 explained above. Alternatively, this processing is recursively invoked from the processing. In that case, a test target row of the deadlock graph matrix 157, i.e., one of start nodes (lock target objects) of a directed side configuring a graph is passed as an argument.

First, the deadlock-risk-part detecting section 160 sets the start node as a present node. If the present node is recorded in the deadlock detection work area 165 (step J110: yes), the deadlock-risk-part detecting section 160 acquires a node row including a node already stored in the deadlock detection work area 165 and up to a node stored in the deadlock detection work area 165 after the node. Further, the deadlock-risk-part detecting section 160 sets a relevant place of the deadlock graph matrix 157 corresponding to the node row as a deadlock risk area (step J170).

The processing is explained using an example shown in FIG. 14. When it is attempted to push $V_4$ to the deadlock detection work area anew, $V_4$ is already present in the deadlock detection work area. At this point, elements of $(V_4, V_1)$, $(V_1, V_3)$, and $(V_3, V_4)$ of the deadlock graph matrix 157 are deadlock risk parts. After step J170, the deadlock-risk-part detecting section 160 returns to the original processing.

When the present node is not recorded in the deadlock detection work area 165 in step J110, the deadlock-risk-part detecting section 160 pushes an ID of the present node to the deadlock detection work area (step J120).

Subsequently, the deadlock-risk-part detecting section 160 selects a column in which 1 is set among relevant rows of the present node in the deadlock graph matrix 157 (step J130). If all destination nodes are already tested concerning the column in which 1 is set (step J140: yes), the deadlock-risk-part detecting section 160 extracts information concerning the present node pushed to the deadlock detection work area (step J160) and returns from this processing to the original processing.

When an untested node is present in step J140 (no), the deadlock-risk-part detecting section 160 sets a node ID indicated by one of columns in which 1 is set as a present node ID and an argument and recursively invokes the deadlock risk detection processing (step J150).

The operation of the emergency processing section 180 is explained below with reference to FIG. 15. The processing is applied to a deadlock risk part selected by the administrator via the GUI 170 among deadlock risk parts found by the deadlock-risk-part detecting section 160.

First, the emergency processing section 180 extracts one of a plurality of deadlock risk parts detected by the deadlock-risk-part detecting section 160 (step K110). The deadlock-risk-part detecting section 160 extracts deadlock risk parts, for example, "$(V_4, V_1)$, $(V_1, V_3)$, and $(V_3, V_4)$" and acquires, referring to a deadlock graph matrix side attribute table of respective sides of $(V_4, V_1)$ and the like, a plurality of sets of a plurality of lock command places referred to by a set of a sequence ID for each side and a row ID of the lock address table 159 for each side.

If emergency processing is already performed for all the deadlock risk parts (step K120: yes), the emergency processing section 180 returns to the original processing. When a deadlock risk area not subjected to the emergency processing yet is present (no), the emergency processing section 180 creates new lock target object V (step K125).

In step K110, the emergency processing section 180 extracts one out of a plurality of sequence IDs corresponding to the acquired deadlock risk part and extracts a subset of deadlock risk parts corresponding to the sequence ID (step K130).

When the processing is completed for all the sequence IDs (step K140: yes), the emergency processing section 180 returns to step K110 and applies the processing to the other deadlock risk parts.

When an unprocessed sequence ID is present (step K140: no), the emergency processing section 180 extracts a row of the relevant sequence ID of the deadlock class thread table and acquires, referring to the lock address table 159, a lock command place of an src node of a row of the relevant ID in a deadlock graph side attribute table of an element of a deadlock graph matrix indicated by the row. Further, the emergency processing section 180 searches through the program code 190 and acquires an unlock relevant place corresponding to the lock command place (step K150).

Concerning a top lock command place and an unlock command place corresponding to the top lock command place, the emergency processing section 180 inserts, into a relevant file, a lock request command and an unlock command targeting the lock target object V (step K170).

That is, the emergency processing section 180 creates a cock command to include a lock and unlock command that is likely to cause a deadlock. Therefore, it is possible to prevent a deadlock. A time sequence of lock and unlock command issuance is shown in FIG. 22. For simplification, in FIG. 22, $T_2$, $T_3$, and $T_5$ unrelated to a deadlock are removed from FIG. 23 showing an example in which the deadlock occurs. In FIG. 22, a lock command and an unlock command for the lock target object V are inserted into $T_1$ and $T_4$ in FIG. 23. Consequently, $T_4$ causes $T_1$ to wait for lock and a series of operation can be executed. Therefore, it is possible to prevent a deadlock.

Since a new lock target object V is generated separately from an existing lock target object, a situation does not occur in which lock with respect to the lock target object V interferes with existing lock and causes a new deadlock. When the processing in step K170 ends, the emergency processing section 180 returns to step K140 and performs a test of the next thread.

In the first embodiment, even if a risk part in which a deadlock occurs is present in a program, the risk part cannot be detected unless a deadlock actually occurs. However, when a deadlock actually occurs, a situation sometimes occurs in which a system cannot provide a service, it is desirable to predict occurrence of a deadlock beforehand. According to the second embodiment, every time the application programs 120 and 130 perform a lock request, the deadlock-graph creating section 156 records a history of lock in the deadlock graph matrix 157. Therefore, it is possible to not only detect a deadlock when the deadlock occurs but also point out, even when, although there is a risk of a deadlock, the deadlock does not occur because of timing, a place where there is the risk of the deadlock.

According to the second embodiment, the emergency processing section 180 rewrites the program code 190 with respect to a deadlock risk place pointed out by the deadlock-risk-part detecting section 160 and inserts lock and unlock for encompassing a deadlock risk part into the program code 190. Therefore, it is possible to prevent a deadlock.

It is possible to avoid a deadlock even if a function for deadlock avoidance is not imparted to the application programs 120 and 130. This is because the emergency processing section 180 rewrites a deadlock risk place in the application programs and inserts a lock command into a deadlock risk part. The insertion of the code is performed by the emergency processing section 180. Therefore, it is unnecessary to rewrite the application programs per se.

Third Embodiment

Figure 25:
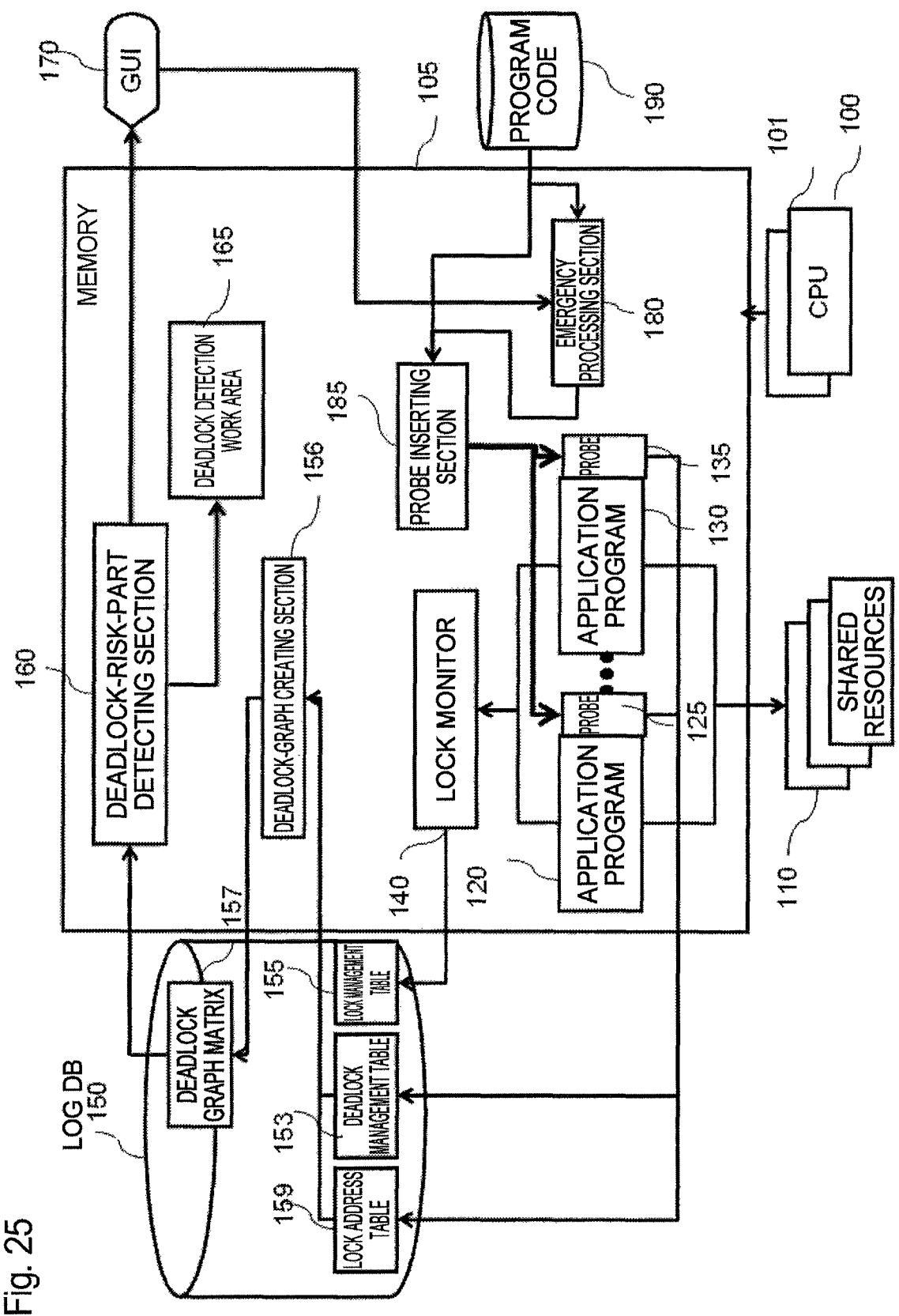
FIG. 25 is a block diagram showing the configuration of a deadlock preventing apparatus according to a third embodiment of the present invention.

FIG. 25 is a block diagram showing the configuration of a deadlock preventing apparatus according to a third embodiment of the present invention. As shown in FIG. 25, in the third embodiment, the deadlock preventing apparatus includes a probe inserting section 185 and probes 125 and 135 in addition to the components in the second embodiment. Note that the deadlock preventing apparatus may include the probe inserting section 185 and the probes 125 and 135 in addition to the components in the first embodiment.

The probe inserting section 185 inserts, when the application programs 120 and 130 or the like are disposed from the program code 190, the probes 125 and 135 explained below immediately before a lock command for the application programs. The probes 125 and 135 are executed immediately before the lock command is executed and record, in the lock address table 159 and the deadlock management table 153, a lock target object and a thread that requests lock, a program file in which a program requested to be locked is described, and an address in which a lock command in the program file is described.

Figure 26:
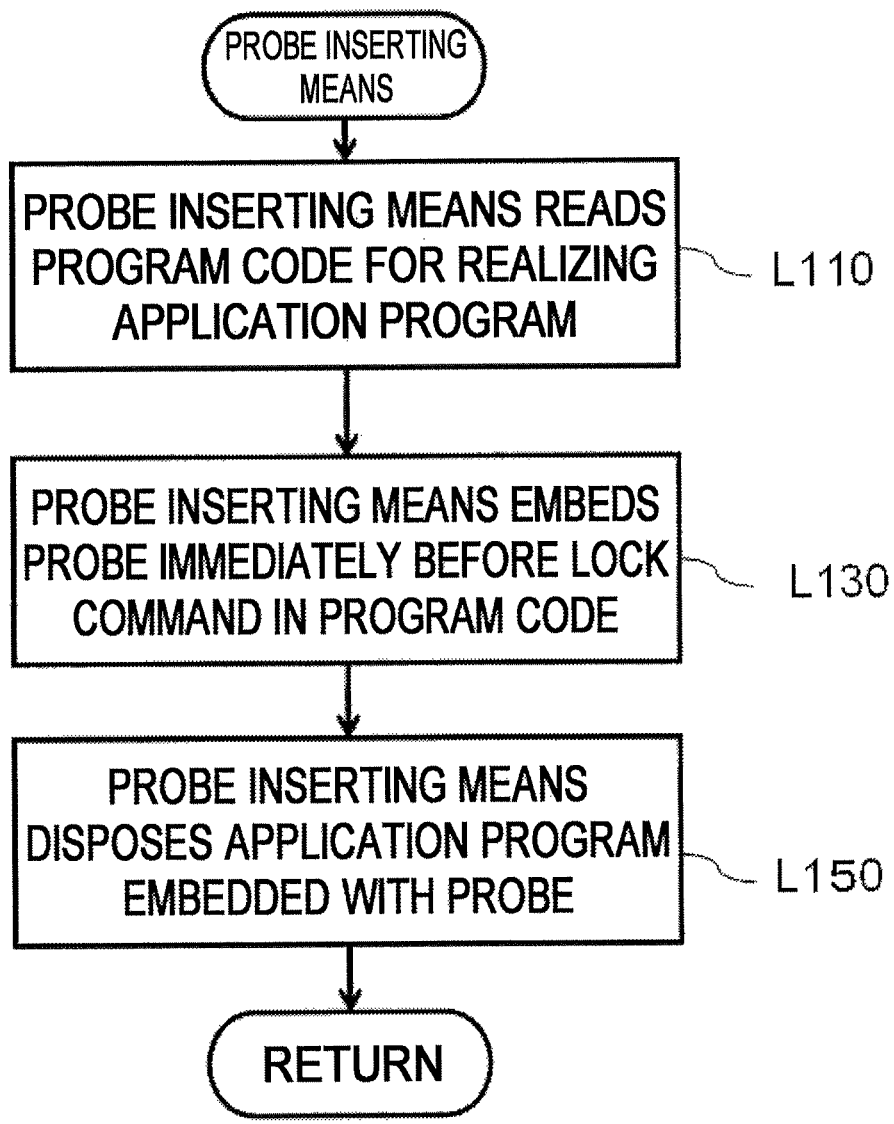
FIG. 26 is a flowchart of the operation of the deadlock preventing apparatus according to the third embodiment of the present invention.

An overall operation of this embodiment is explained in detail below with reference to FIG. 26.

First, the probe inserting section 185 reads the program code 190 for realizing the application programs 120 and 130 (step L110).

Subsequently, the probe inserting section 185 embeds the probes 125 and 135 immediately before the lock command in the program code 190 (step L130). Finally, the probe inserting section 185 disposes the application programs 120 and 130 embedded with the probes 125 and 135 (step L150).

As explained above, according to this embodiment, the probe inserting section 185 is configured to rewrite a program and record a lock operation. Therefore, it is possible to point out a risk of lock and prevent lock even if the existing lock monitor 140 is not remodeled.

EXAMPLE

An example of the present invention is explained below.

Figure 34:
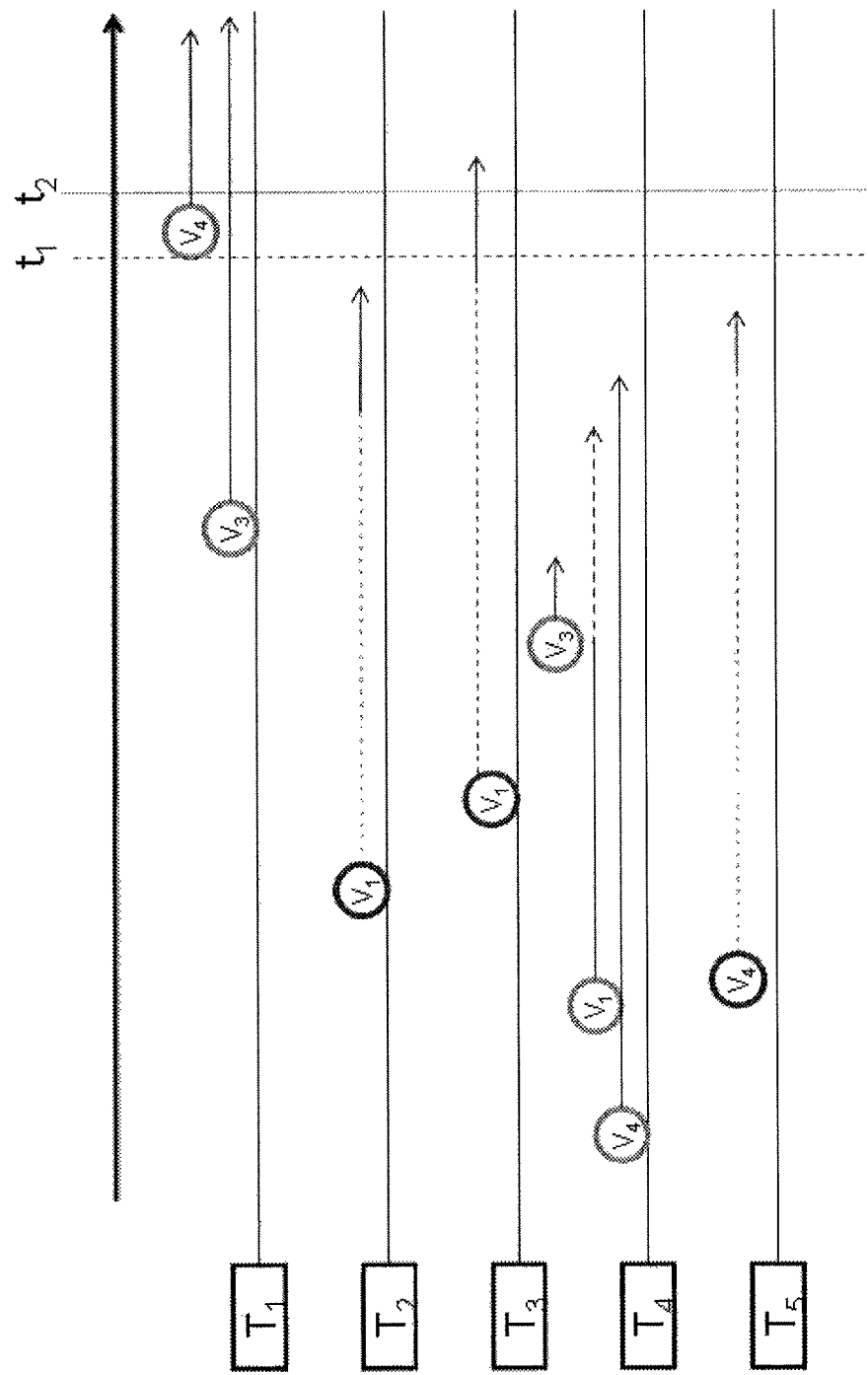
FIG. 34 is a diagram showing a time sequence of lock and unlock command issuance according to the example of the present invention.

For example, a case in which lock and unlock shown in FIG. 34 occur is considered. Concerning operation in which the thread $T_1$ locks the lock target object $V_4$ at time $t_1$, a state immediately before the operation and a state immediately after the operation are compared.

Figure 4:
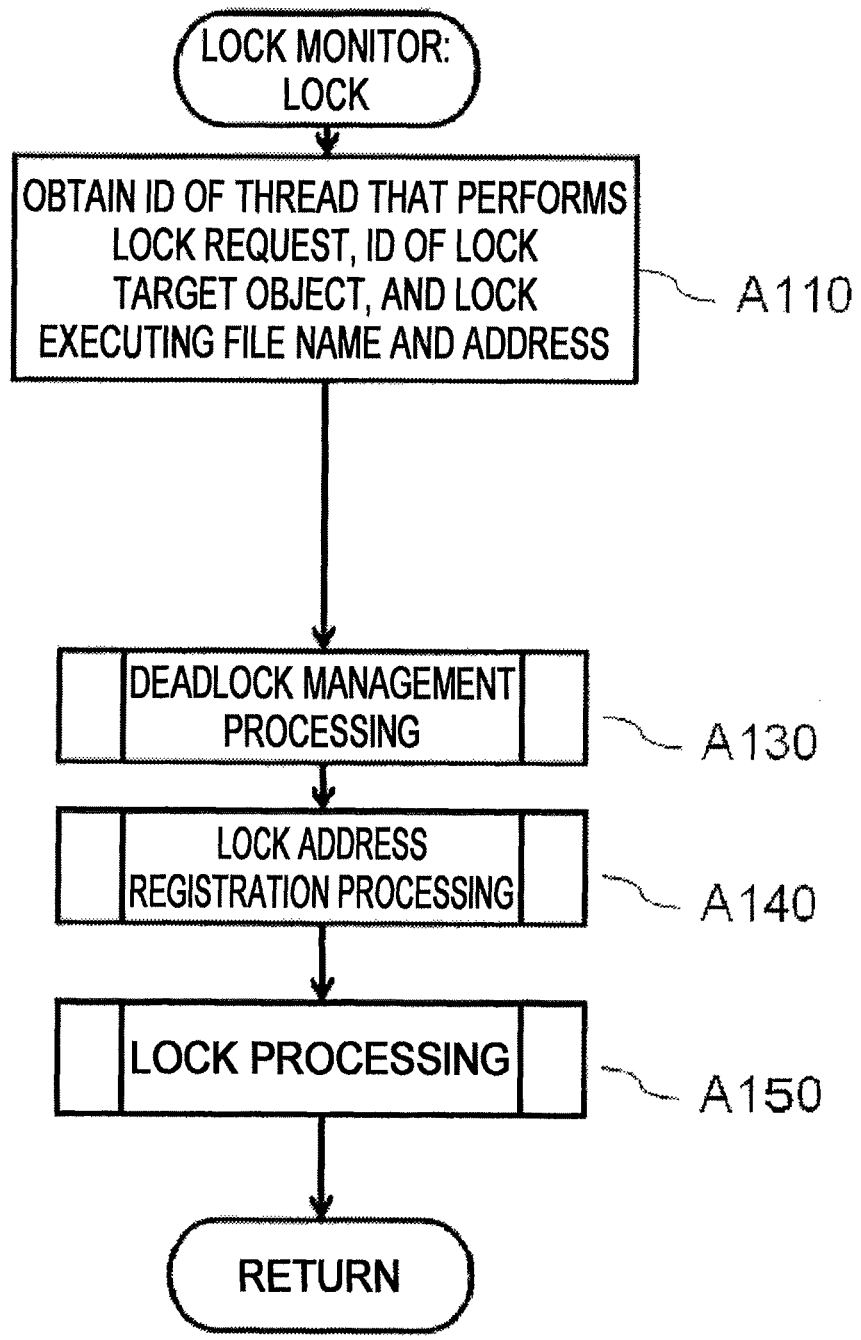
FIG. 4 is a flowchart of lock request processing of a lock monitor according to the embodiment of the present invention.

By performing the unlock and lock shown in FIG. 34, at time $t_1$, the lock monitor 140 records the lock management table 155 as shown in FIG. 19 (step A150 in FIG. 4). A portion of a solid line is a lock request thread recorded by the lock management table 155. A dotted line is an unlocked lock request thread. This is described for explanation. At a point of time $t_1$, the lock request thread is not recorded in the lock management table 155. Referring to FIG. 34, lock is requested in the order of the threads $T_4$, $T_2$, and $T_1$ with respect to the lock target object $V_1$. Therefore, in the lock management table 155 shown in FIG. 19, a row of $V_1$ is recorded in the order of $T_4 \rightarrow T_2 \rightarrow T_3 \rightarrow \underline{T_4} \rightarrow \underline{T_2}$. Underlines indicate unlock commands and no-underline indicates lock commands.

Figure 8:
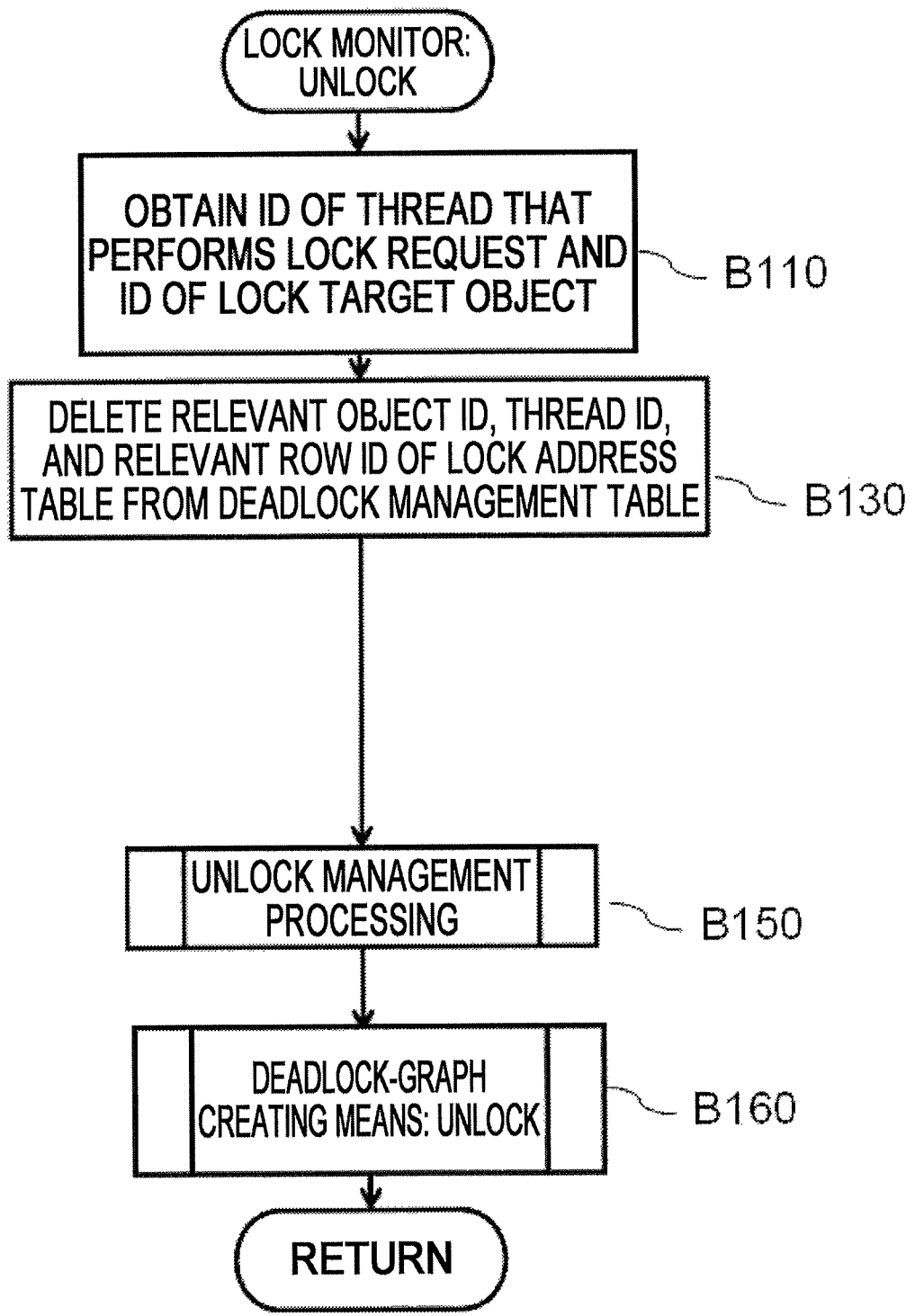
FIG. 8 is a flowchart of unlock processing of the lock monitor according to the embodiment of the present invention.

$T_4$ and $T_1$ that request lock first unlock and release $V_1$ (step B150 in FIG. 8). Therefore, $T_2$ that requests lock third is a thread that acquires lock of the object $V_1$. As explained above, in the lock management table 155 shown in FIG. 19, threads drawn by dotted lines are unlocked threads and deleted from the lock management table 155.

A state of the deadlock management table 153 at time $t_1$ in FIG. 34 is shown in FIG. 16. As indicated by step A130 and step B130, if lock is requested, a lock target object ID is pushed to a stack of a relevant thread ID of the deadlock management table 153. In unlock is requested, the lock target object ID is popped.

At time $t_1$ in FIG. 34, $T_1$ locks $V_3$ and $T_3$ locks $V_1$ as shown in FIG. 16.

A state of the deadlock graph 157 at time $t_1$ in FIG. 34 is shown in FIG. 17. In step A150, every time the lock monitor 140 describes lock information in the deadlock management table 153, the deadlock-graph creating section 156 writes 1 in a relevant entry of the deadlock graph matrix 157 (step E140 in FIG. 5).

At time $t_1$ in FIG. 34, $T_4$ performs lock and unlock in the order of $V_4 \rightarrow V_1 \rightarrow V_3 \rightarrow \underline{V_3} \rightarrow \underline{V_1} \rightarrow \underline{V_4}$. Therefore, the deadlock-graph creating section 156 describes a relation between $V_4 \rightarrow V_1$ and $V_1 \rightarrow V_3$, which are continuously locked, in the deadlock graph matrix 157. That is, 1 is written in elements of $(V_4, V_1)$ and $(V_1, V_3)$.

The thread $T_4$ already unlocked all of the objects in the order of $V_4 \rightarrow V_1 \rightarrow V_3 \rightarrow \underline{V_3} \rightarrow \underline{V_1} \rightarrow \underline{V_4}$. Therefore, a thread ID of a row of a sequence ID 1 of a deadlock graph thread table indicating $V_4$ at the top of this order row is "ended".

In a deadlock graph side attribute table corresponding to $(V_1, V_3)$ of the deadlock graph matrix, #2, which is a lock command place of lock for $V_1$, #6, which is a lock command place of lock for $V_2$, and the sequence ID 1 are recorded.

A state of the lock address table 159 at time $t_1$ in FIG. 34 is shown in FIG. 20. The lock monitor 140 records, in the lock address table 159, a lock request place (a file name and an address) where a lock request is performed (step A140).

A state of the lock management table 155 at time $t_2$ in FIG. 34 is shown in FIG. 21. That is, an example in which, after time $t_1$, the thread $T_1$ requests the object $V_4$ to be locked is shown. First, the lock monitor 140 registers, in the lock management table 155, that the thread $T_1$ requests the object $V_4$ to be locked (step A150). According to this operation, the thread $T_1$ is added to a row of the lock target object $V_4$ of the lock management table 155 shown in FIG. 21.

A state of the lock address table 159 at time $t_2$ in FIG. 34 is shown in FIG. 27. In the lock address table 159 shown in FIG. 20, the lock monitor 140 records a file name com.nec.a.B, which causes a lock request, and an address "19" on the file that causes a lock request command (step G110 in FIG. 6). The lock monitor 140 acquires this row ID "#8".

Figure 28:
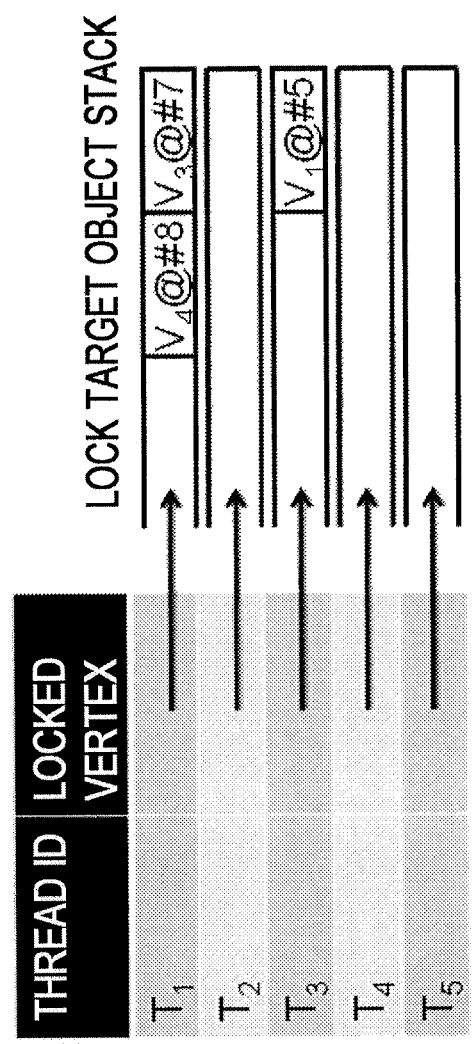
FIG. 28 is a diagram showing a state of a deadlock management table according to the example of the present invention.

A state of the deadlock management table 153 at time $t_2$ in FIG. 34 is shown in FIG. 28. The lock monitor 140 records lock information, i.e., a lock request for the object $V_4$, in a lock target object stack corresponding to the thread $T_1$ of the deadlock management table 153 (step E130 in FIG. 5). That is, the lock monitor 140 pushes, to a row of the thread $t_1$ of the deadlock management table 153 shown in FIG. 16, a set of the row ID "#8" of a corresponding lock command place of the lock address table 159 and the lock target object ID $V_4$ (step E130). As a result, the deadlock management table 153 shown in FIG. 28 is obtained.

Figure 10:
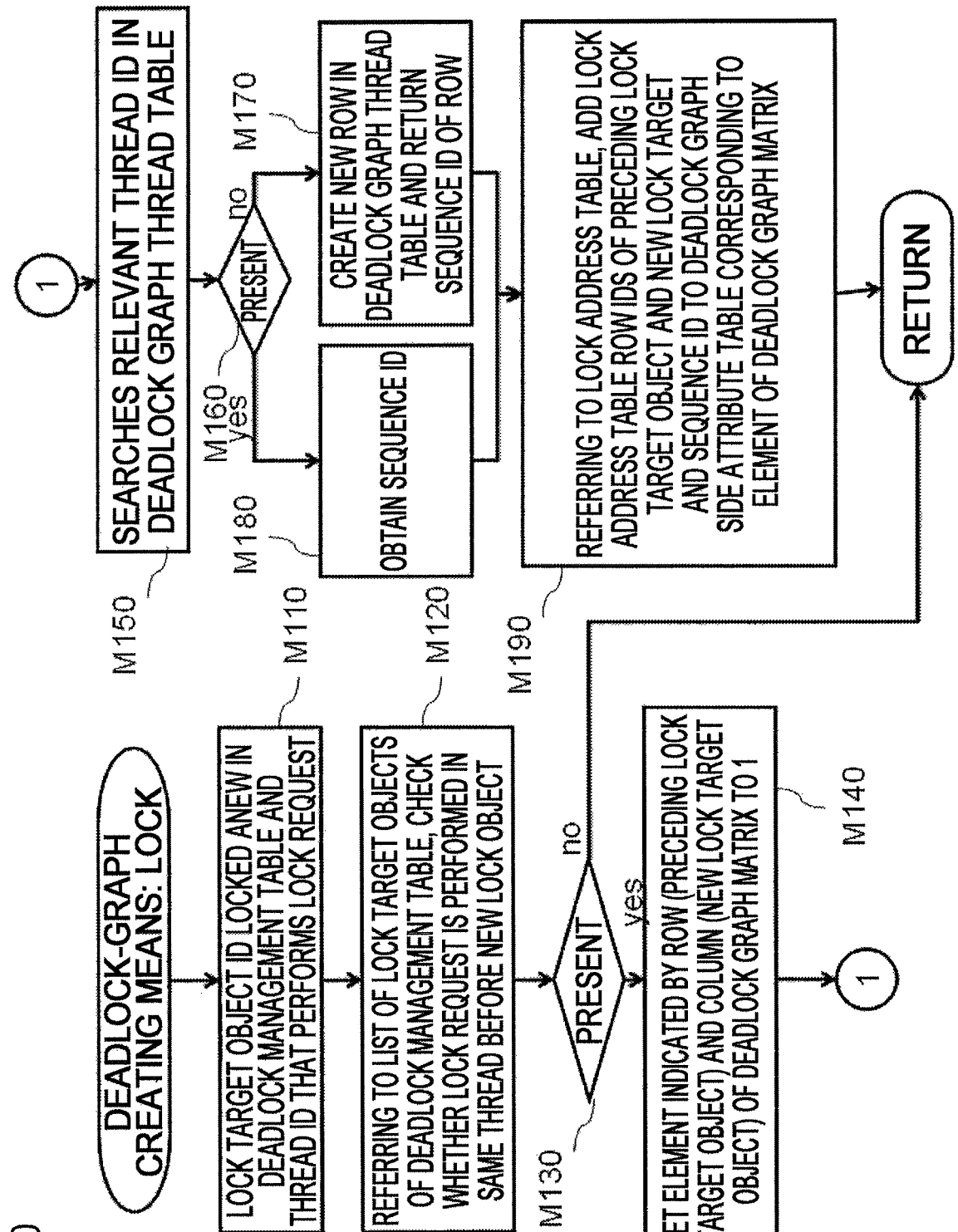
FIG. 10 is a flowchart of lock processing of a deadlock graph creating section according to the embodiment of the present invention.
Figure 30:
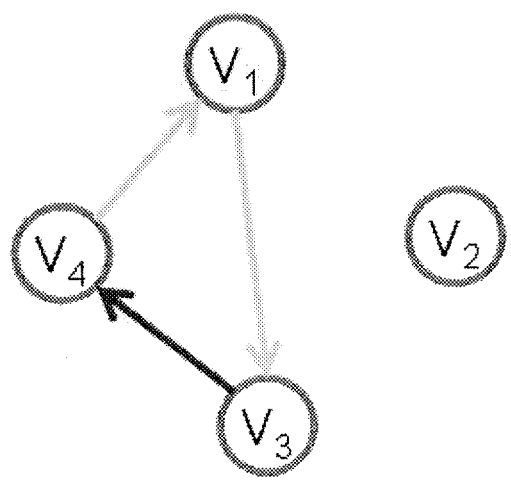
FIG. 30 is a diagram showing an example of a deadlock graph according to the example of the present invention.

When the deadlock management table 153 is changed, the deadlock-graph creating section 156 records 1 in $(V_3, V_4)$ of the deadlock graph matrix 157 (step M140 in FIG. 10). Consequently, the deadlock graph matrix 157 shown in FIG. 17 is as shown in FIG. 29. This is because, as shown in FIG. 28, a lock target object recorded immediately preceding the lock target object $V_4$ pushed to the deadlock management table 153 is $V_3$. The deadlock graph matrix 157 in FIG. 29 has a value same as a value of a graph shown in FIG. 30. As shown in FIG. 29, since a thread ID $T_1$ is not recorded in the deadlock class thread table (step M160), the deadlock-graph creating section 156 adds a new row (a sequence ID 2) to the deadlock class thread table and records a pointer to the element $(V_3, V_4)$ of the deadlock graph matrix and the thread ID $T_1$ (step M180). Consequently, the deadlock class thread table shown in FIG. 17 changes as shown in FIG. 29.

As shown in FIG. 29, the deadlock-graph creating section 156 adds, as a new row, in the deadlock graph side attribute table corresponding to the element ($V_3$, $V_4$) of the deadlock graph matrix, a sequence ID 2, a relevant entry #7 of the lock address table 159 of $V_3$, which is src, and a relevant entry #8 of the lock address table 159 of $V_4$, which is dest (step M190). Consequently, the deadlock graph side attribute table shown in FIG. 17 changes as shown in FIG. 29.

The deadlock-risk-part detecting section 160 checks, referring to the deadlock graph matrix 157, whether a closed graph is formed. For example, a case in which the deadlock target object $V_4$ is selected in step 1110 in FIG. 12 is explained using FIG. 29. The deadlock-risk-part detecting section 160 searches for the next node on the graph as $V_1 \rightarrow V_3$ after $V_4$ (step J130). As a result, as shown in FIG. 14, the deadlock-risk-part detecting section 160 records $V_4$, $V_1$, and $V_3$ and an ID of the lock target object in the deadlock detection work area 165.

The deadlock-risk-part detecting section 160 checks that the deadlock target object $V_4$ is present in the deadlock detection work area 165 (step J110). At this point, as shown in FIG. 14, since the deadlock target object $V_4$ is already present in the deadlock detection work area 165, the deadlock-risk-part detecting section 160 discriminates that deadlock occurs and sets $V_4$, $V_1$, and $V_3$ as deadlock risk areas (step J170).

Figure 31:
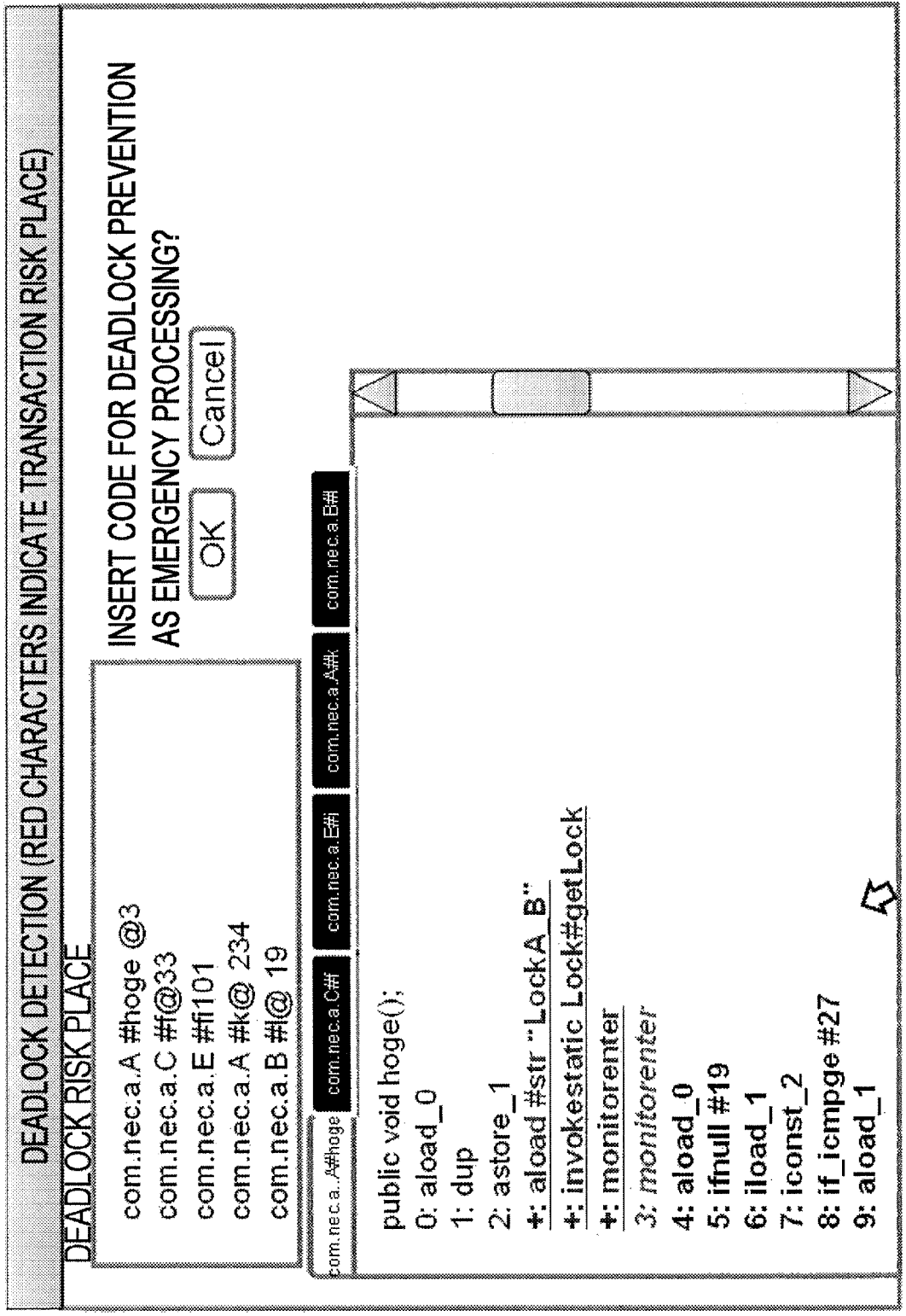
FIG. 31 is a diagram showing a display example of a GUI according to the embodiment of the present invention.

The deadlock-risk-part detecting section 160 presents this result to the administrator via the GUI 170. An example of the GUI is shown in FIG. 31. For example, buttons for displaying a list of lock command places recorded in the deadlock graph side attribute table of nodes determined as deadlock risk areas, displaying a program code of an application program related to a lock command place, and confirming with the administrator about possibility of program code modification for lock prevention are arranged. That is, the administrator determines, through the GUI 170, whether a code for deadlock prevention is inserted.

The emergency processing section 180 corrects the program code 190 of a place where a risk of a deadlock is present and disposes the program code 190 as the application programs 120 and 130 again. That is, first, the emergency processing section 180 creates the deadlock target object V (step K125).

The emergency processing section 180 searches through the deadlock graph side attribute table concerning the elements ($V_4$, $V_1$), ($V_1$, $V_3$), and ($V_3$, $V_4$) of the deadlock graph matrix 157 determined as deadlock risk areas and obtains rows of values (1, #1, #2), (1, #2, #6), and (2, #7, #8), respectively. As sequence IDs, 1 and 2 are included. First, one of the sequence IDs, the emergency processing section 180 selects a sequence 1 (step K125).

When the deadlock graph thread table shown in FIG. 29 is referred to concerning the sequence ID 1, the top is ($V_4$, $V_1$). When the deadlock graph side attribute table corresponding to ($V_4$, $V_1$) in FIG. 29 is referred to, a lock address table row ID of $V_4$, which is src, is #1.

When the lock address table 159 shown in FIG. 27 is referred to, a lock command place indicated by #1 is an address hoge@3 of com.nec.a.A. Therefore, the emergency processing section 180 finds, from the program code 190, an unlock command corresponding a lock command in the address hoge@3 of com.nec.a.A (step K150) and inserts a lock command and an unlock command for V to surround the lock command and the unlock command (step K160).

Subsequently, when the deadlock graph thread table is referred to concerning a sequence 2, the top is ($V_3$, $V_4$). When the deadlock graph side attribute table corresponding to ($V_3$, $V_4$) is referred to, a lock address table row ID of $V_3$, which is src, is #7.

When the lock address table 159 shown in FIG. 27 is referred to, a lock command place indicated by #3 is an address g@30 of com.nec.a.F. Therefore, the emergency processing section 180 finds, from the program code 190, an unlock place corresponding a lock command in the address g@30 of com.nec.a.F (step K150) and inserts a lock command and an unlock command for V to surround the lock command and the unlock command (step K160).

Note that an example of the program code 190 referred to by the emergency processing section 180 is shown in FIG. 32 and an example of a code after rewriting is shown in FIG. 33. A lock command is inserted into an address 3-5 and an unlock command is inserted into an address 14-16 in FIG. 33.

This application claims priority based on Japanese Patent Application No. 2011-107588 filed on May 12, 2011, the entire disclosure of which is incorporated herein.

The present invention is explained above with reference to the embodiments. However, the present invention is not limited to the embodiments. Various changes understandable by those skilled in the art can be made to the configuration and the details of the present invention within the scope of the present invention.

A part or all of the embodiments explained above can also be described as indicated by notes below. However, the embodiments are not limited to the below.

(Note 1) A deadlock preventing apparatus including:
  a deadlock-occurrence-position detecting section configured to detect a lock command causing a deadlock on a code of an application program; and
  an emergency processing section configured to insert a new lock command and a new unlock command to the program code to encompass a part from a lock command place corresponding to the lock command detected by the deadlock-occurrence-position detecting section to an unlock command place.

(Note 2) The deadlock preventing apparatus described in note 1, wherein the deadlock-occurrence-position detecting section detects, on the basis of recording information of a state of lock by the application program, the lock command causing the deadlock.

(Note 3) The deadlock preventing apparatus described in note 1, further including:
  a lock monitor configured to receive a lock request and an unlock request from the application program and manage a state of lock;
  a lock-management-table storing section for the lock monitor to manage the state of the lock;
  a deadlock-management-table storing section in which the lock monitor records the state of the lock in order to detect the deadlock;
  a deadlock-graph-matrix storing section configured to manage a history of the state of the lock and record a place where the lock is performed in the application program; and
  a deadlock-graph creating section configured to create the deadlock graph matrix referring to the deadlock management table, wherein
  the deadlock-occurrence-position detecting section detects, on the basis of the deadlock graph matrix, a position where the deadlock is likely to occur.

(Note 4) The deadlock preventing apparatus described in any one of notes 1 to 3, further including a GUI for presenting the position detected by the deadlock-occurrence-position detecting section.

(Note 5) The deadlock preventing apparatus described in note 3, further including a lock-address-table storing section in which the lock monitor records a position where a lock request is issued on the program code, wherein
- the deadlock-graph creating section creates the deadlock graph matrix referring to the deadlock management table and the lock address table, and
- the deadlock-occurrence-position detecting section detects, on the basis of the deadlock graph matrix, likelihood of deadlock occurrence and a position of a lock command on the program code likely to cause the deadlock.

(Note 6) The deadlock preventing apparatus described in note 5, further including a GUI for presenting the likelihood of the deadlock occurrence and the position of the lock command on the program code likely to cause the deadlock detected by the deadlock-occurrence-position detecting section.

(Note 7) The deadlock preventing apparatus described in any one of notes 1 to 6, further including a probe inserting section configured to embed, in the application program, a probe for recording lock information in the deadlock management table and the lock address table when the application program is executed.

(Note 8) The deadlock preventing apparatus described in note 1, further including:
- a deadlock-graph-matrix storing section configured to record a history of the lock command by the application program; and
- a lock-address-table storing section configured to record a lock command place on the program code corresponding to the lock command by the application program, wherein
- the emergency processing section acquires, referring to the lock address table, a lock command place corresponding to the lock command causing the deadlock detected on the basis of the deadlock graph matrix, searches through the program code and acquires an unlock command place corresponding to the lock command place, and inserts a new lock command and a new unlock command to the program code to encompass a part from the lock command place to the unlock command place.

(Note 9) A deadlock preventing method including:
- detecting a lock command causing a deadlock on a code of an application program; and
- inserting a new lock command and a new unlock command to the program code to encompass a part from a lock command place corresponding to the detected lock command to an unlock command place.

(Note 10) A program for causing a computer to function as:
- a deadlock-occurrence-position detecting section configured to detect a lock command causing a deadlock on a code of an application program; and
- an emergency processing section configured to insert a new lock command and a new unlock command to the program code to encompass a part from a lock command place corresponding to the lock command detected by the deadlock-occurrence-position detecting section to an unlock command place.

The present invention is suitable for causing a computer to execute processing in parallel using shared resources and in response to a request of a client.

100, 101 CPU
105 Memory
110 Shared resources
120, 130 Application Programs
125, 135 Probes
140 Lock monitor
150 Log DB
153 Deadlock management table
155 Lock management table
156, 356 Deadlock-graph creating sections
157 Deadlock graph matrix
159 Lock address table
160 Deadlock-risk-part detecting section
165 Deadlock detection work area
170 GUI
180 Emergency processing section
185 Probe inserting section
190 Program code
360 Deadlock detecting section

I claim:

1. A deadlock preventing apparatus comprising:
a processor for executing an application program;
a memory in communication with the processor;
a deadlock-occurrence-position detecting section configured to detect a lock command causing a deadlock on a program code of the application program;
an emergency processing section configured to insert a new lock command and a new unlock command to the program code to encompass a part from a lock command place corresponding to the lock command detected by the deadlock-occurrence-position detecting section to an unlock command place;
a lock monitor configured to receive a lock request and an unlock request from the application program and manage a state of a lock;
a lock-management-table storing section for the lock monitor to manage the state of the lock;
a deadlock-management-table storing section in which the lock monitor records the state of the lock in order to detect the deadlock;
a deadlock-graph-matrix storing section configured to manage a history of the state of the lock and record a place where the lock is performed in the application program;
a lock-address-table storing section in which the lock monitor records a position where a lock request is issued on the program code; and
a deadlock-graph creating section configured to create the deadlock graph matrix referring to the deadlock management table and the lock address table,
wherein
the deadlock-occurrence-position detecting section detects, on the basis of the deadlock graph matrix, likelihood of deadlock occurrence, a position where the deadlock is likely to occur, and a position of the lock command on the program code likely to cause the deadlock.

2. The deadlock preventing apparatus according to claim 1, wherein the deadlock-occurrence-position detecting section detects, on the basis of recording information of a state of lock by the application program, the lock command causing the deadlock.

3. The deadlock preventing apparatus according to claim 1, further comprising a GUI for presenting the position detected by the deadlock-occurrence-position detecting section.

4. The deadlock preventing apparatus according to claim 1, further comprising a GUI for presenting the likelihood of the deadlock occurrence and the position of the lock command on the program code likely to cause the deadlock detected by the deadlock-occurrence-position detecting section.

5. The deadlock preventing apparatus according to claim 1, further comprising a probe inserting section configured to embed, in the application program, a probe for recording lock information in the deadlock management table and the lock address table when the application program is executed.

6. The deadlock preventing apparatus according to claim 1, wherein:
- the deadlock-graph-matrix storing section is configured to record a history of the lock command by the application program,
- the lock-address-table storing section is configured to record the lock command place on the program code corresponding to the lock command by the application program, and
- the emergency processing section acquires, referring to the lock address table, the lock command place corresponding to the lock command causing the deadlock detected on the basis of the deadlock graph matrix, searches through the program code and acquires the unlock command place corresponding to the lock command place, and inserts the new lock command and the new unlock command to the program code to encompass a part from the lock command place to the unlock command place.

7. A deadlock preventing method comprising:
- storing a program code of the application program to a memory; and
- executing, by a processor, the stored program code;
- receiving a lock command of a lock on the program code of the application program;
- recording the state of the lock;
- managing the state of the lock;
- recording a place where the lock is performed in the application program;
- recording a position where the lock command is issued on the program code; and
- detecting, on the basis of a history of the state of the lock, the place where the lock is performed in the application program, and the position where the lock command is issued on the program code, likelihood of deadlock occurrence, a position where a deadlock is likely to occur, and a position of the lock command on the program code likely to cause the deadlock, wherein the history comprises a deadlock-graph-matrix;
- if the deadlock is detected, inserting a new lock command and a new unlock command to the program code to encompass a part from a lock command place corresponding to the lock command to an unlock command place.

* * * * *